(12) United States Patent
Condo et al.

(10) Patent No.: US 10,023,724 B2
(45) Date of Patent: *Jul. 17, 2018

(54) NANOCOMPOSITES CONTAINING SPHERICAL PYROGENIC SILICA NANOPARTICLES AND COMPOSITES, ARTICLES, AND METHODS OF MAKING SAME

(71) Applicant: 3M INNOVATIVE PROPERTIES COMPANY, St. Paul, MN (US)

(72) Inventors: Peter D. Condo, Lake Elmo, MN (US); James E. Thorson, Hudson, WI (US); Jeremy O. Swanson, Woodbury, MN (US); Kristin L. Thunhorst, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 51 days.

This patent is subject to a terminal disclaimer.

(21) Appl. No.: 14/911,103

(22) PCT Filed: Aug. 13, 2014

(86) PCT No.: PCT/US2014/050809
§ 371 (c)(1),
(2) Date: Feb. 9, 2016

(87) PCT Pub. No.: WO2015/023718
PCT Pub. Date: Feb. 19, 2015

(65) Prior Publication Data
US 2016/0194480 A1    Jul. 7, 2016

Related U.S. Application Data

(60) Provisional application No. 61/865,308, filed on Aug. 13, 2013, provisional application No. 61/909,575, filed on Nov. 27, 2013, provisional application No. 61/918,302, filed on Dec. 19, 2013, provisional application No. 62/018,993, filed on Jun. 30, 2014.

(51) Int. Cl.
| | |
|---|---|
| C08K 7/16 | (2006.01) |
| C08K 9/04 | (2006.01) |
| C08J 5/24 | (2006.01) |
| C09D 7/12 | (2006.01) |
| C08K 9/06 | (2006.01) |
| C08J 5/00 | (2006.01) |
| C08K 7/00 | (2006.01) |
| C08K 7/18 | (2006.01) |
| C08K 7/28 | (2006.01) |
| C08L 63/00 | (2006.01) |

(52) U.S. Cl.
CPC ............... *C08K 9/04* (2013.01); *C08J 5/005* (2013.01); *C08J 5/24* (2013.01); *C08K 7/00* (2013.01); *C08K 7/18* (2013.01); *C08K 7/28* (2013.01); *C08K 9/06* (2013.01); *C08L 63/00* (2013.01); *C09D 7/12* (2013.01); *B05D 2601/02* (2013.01); *B05D 2601/22* (2013.01); *C08J 2333/08* (2013.01); *C08J 2333/24* (2013.01); *C08J 2363/00* (2013.01)

(58) Field of Classification Search
CPC ... C08K 7/00; C08K 9/04; C08K 7/18; C08K 9/06; C08J 5/24; C08J 2363/00; C08J 5/005

See application file for complete search history.

(56) References Cited

U.S. PATENT DOCUMENTS

| | | |
|---|---|---|
| 3,018,262 A | 1/1962 | Schroeder |
| 3,298,998 A | 1/1967 | McConnell |
| 3,562,223 A | 2/1971 | Bargain |
| 3,627,780 A | 12/1971 | Bonnard |

(Continued)

FOREIGN PATENT DOCUMENTS

| | | |
|---|---|---|
| CN | 1319737 | 10/2001 |
| CN | 101386700 | 3/2009 |

(Continued)

OTHER PUBLICATIONS

ASTM D2196-15, Standard Test Methods for Rheological Properties of Non-Newtonian Materials by Rotational Viscometer.
Lee, "Handbook of Epdxy Resins", McGraw Hill Book Co., 3Pgs. (1967).
May, "Epoxy Resins", Chemistry and Technology, 4Pgs. (1988).
Goodman, "Handbook of Thermoset plastics", 11Pgs. (1998).
Melo, "High Energy Mill Processing of Polymer Based Nanocomposites", Journal of Composite Materials, 2008, vol. 42, No. 22, pp. 2363-2375.
Liu, "A Novel Approach of Chemical Functionalization on Nano-Scaled Silica Particles", Nanotechnology, 2003, vol. 14, pp. 813-819.

(Continued)

*Primary Examiner* — Hannah J Pak
(74) *Attorney, Agent, or Firm* — Adrian L. Pishko

(57) ABSTRACT

A nanocomposite is provided including spherical pyrogenic silica nanoparticles dispersed in a curable resin or a curing agent. The nanocomposite contains less than 2% by weight solvent and less than 0.5% by weight dispersant based on the nanoparticle weight. A composite is also provided including from about 4 to 70 weight percent of spherical pyrogenic silica nanoparticles dispersed in a cured resin, and a filler embedded in the cured resin. Optionally, the composite further contains a curing agent. Further, a method of preparing a nanoparticle-containing curable resin system is provided including mixing from 10 to 70 weight percent of aggregated spherical pyrogenic silica nanoparticles with a curable resin to form a mixture. The mixture contains less than 2% by weight solvent and less than 0.5% by weight dispersant based on the nanoparticle weight. The method also includes milling the mixture in an immersion mill containing milling media to form a milled resin system including silica nanoparticles dispersed in the curable resin.

11 Claims, 7 Drawing Sheets

(56) References Cited

U.S. PATENT DOCUMENTS

| | | | |
|---|---|---|---|
| 3,661,544 A | 5/1972 | Whitaker | |
| 3,839,358 A | 10/1974 | Bargain | |
| 4,100,140 A | 7/1978 | Zahir | |
| 4,157,360 A | 6/1979 | Prevorsek | |
| 4,447,564 A | 5/1984 | Grimmer | |
| 4,468,497 A | 8/1984 | Street | |
| 4,522,958 A | 6/1985 | Das | |
| 4,624,971 A | 11/1986 | van Tao | |
| 4,842,837 A | 6/1989 | Shimizu | |
| 5,221,497 A | 6/1993 | Watanabe | |
| 5,648,407 A | 7/1997 | Goetz | |
| 5,717,009 A | 2/1998 | Matsushita et al. | |
| 5,733,644 A * | 3/1998 | Tanaka | C08L 83/02 428/215 |
| 6,703,116 B2 | 3/2004 | Ohshima et al. | |
| 7,175,118 B2 | 2/2007 | Hockmeyer | |
| 2006/0079623 A1 | 4/2006 | Chen | |
| 2007/0199477 A1 | 8/2007 | Hill | |
| 2007/0232727 A1 | 10/2007 | Lin | |
| 2008/0176987 A1 | 7/2008 | Trevet et al. | |
| 2008/0277814 A1 * | 11/2008 | Moszner | A61K 6/083 264/19 |
| 2009/0137706 A1 | 5/2009 | Healy | |
| 2009/0180976 A1 | 7/2009 | Seeney | |
| 2009/0318598 A1 * | 12/2009 | Perez | C08F 2/22 524/261 |
| 2010/0152325 A1 | 6/2010 | Isayev et al. | |
| 2010/0283004 A1 * | 11/2010 | Lee | H05K 1/032 252/299.65 |
| 2011/0079668 A1 | 4/2011 | Nelson | |
| 2011/0097212 A1 | 4/2011 | Thompson et al. | |
| 2011/0189432 A1 | 8/2011 | Goto | |
| 2011/0245376 A1 | 10/2011 | Schultz | |
| 2011/0309074 A1 | 12/2011 | Thunhorst | |
| 2012/0059086 A1 | 3/2012 | Nelson et al. | |
| 2012/0071586 A1 | 3/2012 | Thunhorst | |
| 2012/0100770 A1 | 4/2012 | Fung | |
| 2012/0202918 A1 | 8/2012 | Singh et al. | |
| 2012/0214948 A1 * | 8/2012 | Condo | B82Y 30/00 525/242 |
| 2012/0244338 A1 | 9/2012 | Schultz | |
| 2013/0037310 A1 | 2/2013 | Kimura | |
| 2016/0194479 A1 * | 7/2016 | Condo | C08J 5/24 523/443 |
| 2016/0194481 A1 * | 7/2016 | Condo | C08J 5/24 523/219 |
| 2016/0200898 A1 * | 7/2016 | Condo | C08J 5/24 523/443 |

FOREIGN PATENT DOCUMENTS

| | | |
|---|---|---|
| CN | 102112536 | 6/2011 |
| CN | 102458646 | 5/2012 |
| CN | 102690496 | 9/2012 |
| EP | 2 490 983 | 8/2016 |
| JP | H0284400 | 3/1990 |
| JP | 2008-214568 | 9/2008 |
| WO | WO 2006-072069 | 7/2006 |
| WO | WO 2008-027979 | 3/2008 |
| WO | WO 2009-120846 | 10/2009 |
| WO | WO 2010-080459 | 7/2010 |
| WO | WO 2011-159521 | 12/2011 |
| WO | WO 2012-037265 | 3/2012 |
| WO | WO 2014-005753 | 1/2014 |
| WO | WO 2015-023640 | 2/2015 |
| WO | WO 2015-023642 | 2/2015 |
| WO | WO 2015-023718 | 2/2015 |

OTHER PUBLICATIONS

International Search Report for PCT International Application No. PCT/US2014/050809 dated Nov. 7, 2014, 3 pages.

Birdi, ed., Handbook of Surface and Colloid Chemistry, $4^{th}$ ed., pp. 640-641 (2015).

Wang, et al., "Corrosion and Control of Tube," Northwestern Polytechnical University Press, Mar. 2013, pp. 137-138.

* cited by examiner

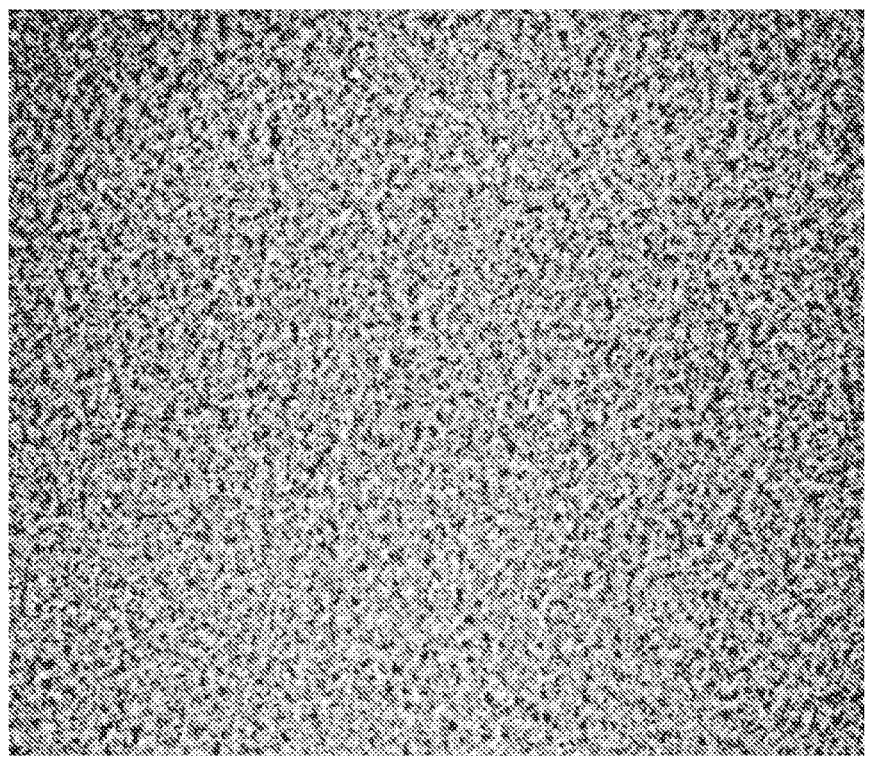
*FIG. 2A*  5 μm
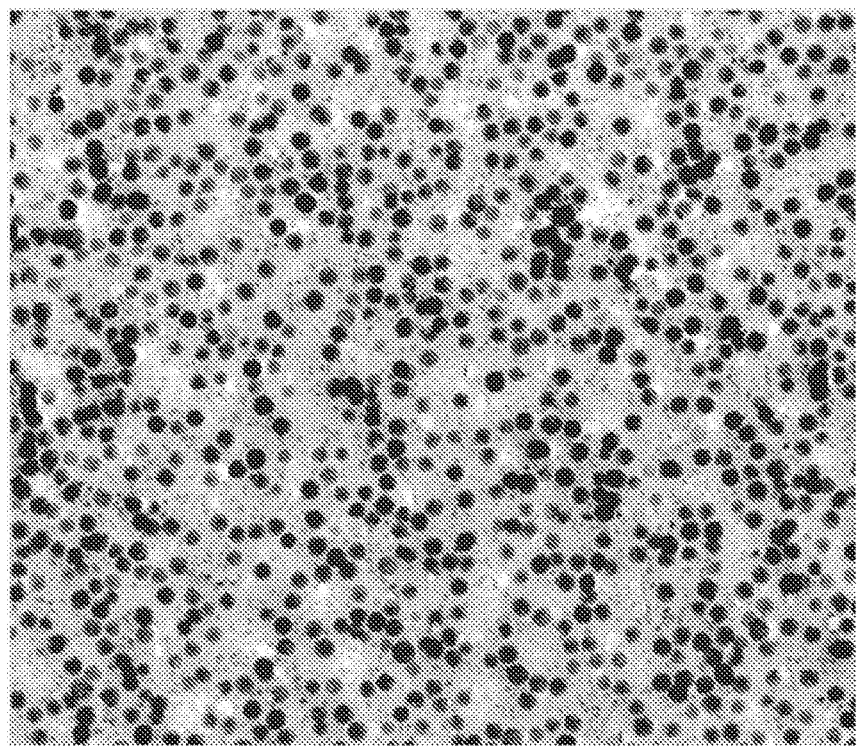
*FIG. 2B*  1 μm

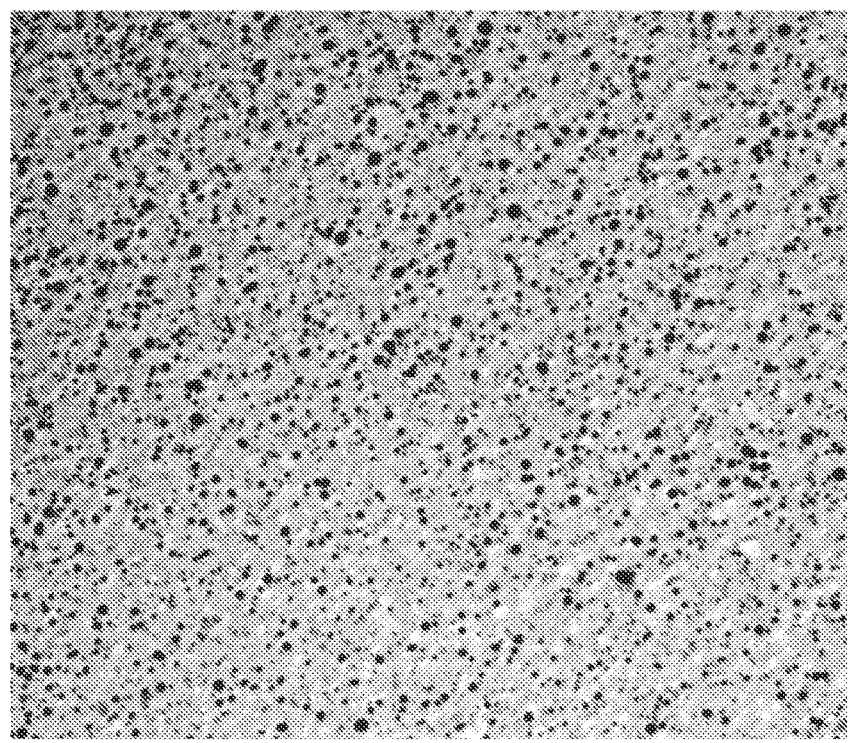
FIG. 3A  5 μm
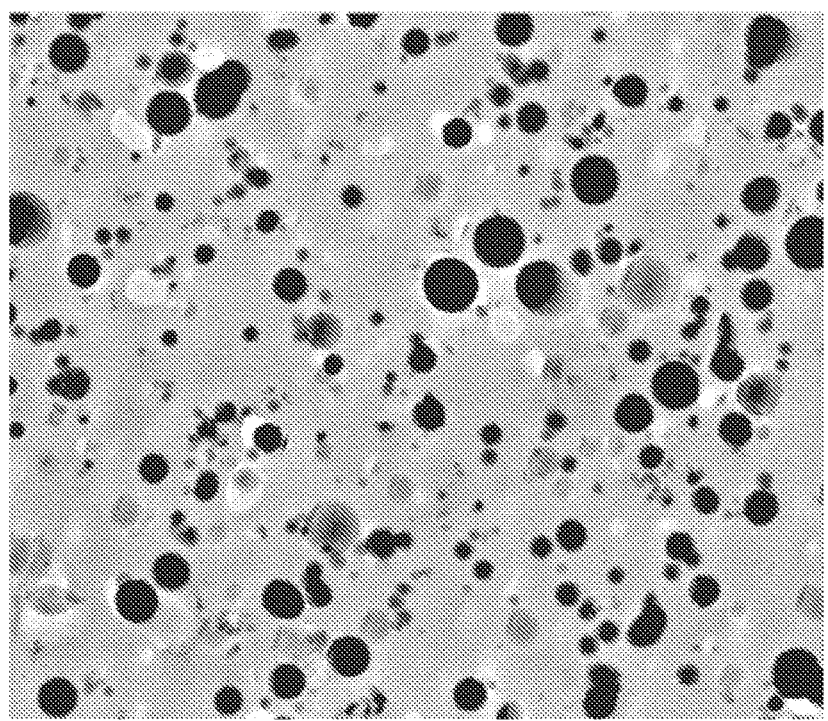
FIG. 3B  1 μm

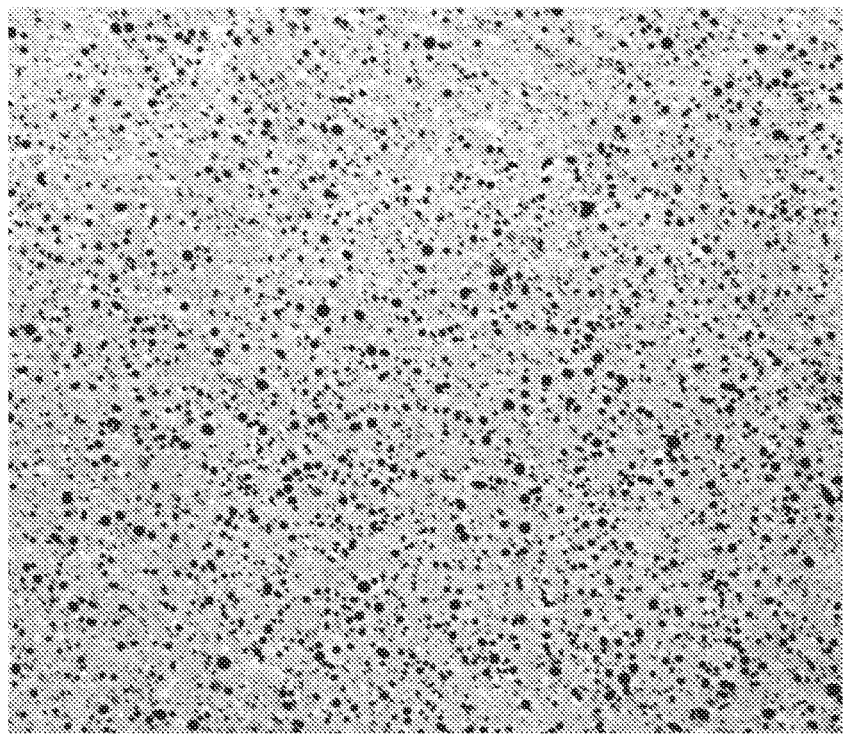
FIG. 4A  5 μm
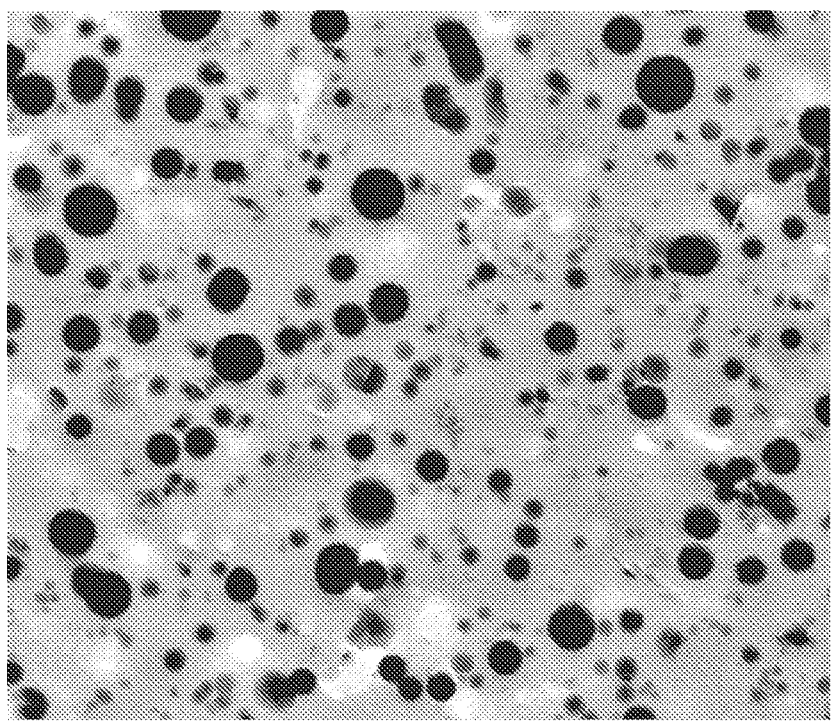
FIG. 4B  1 μm

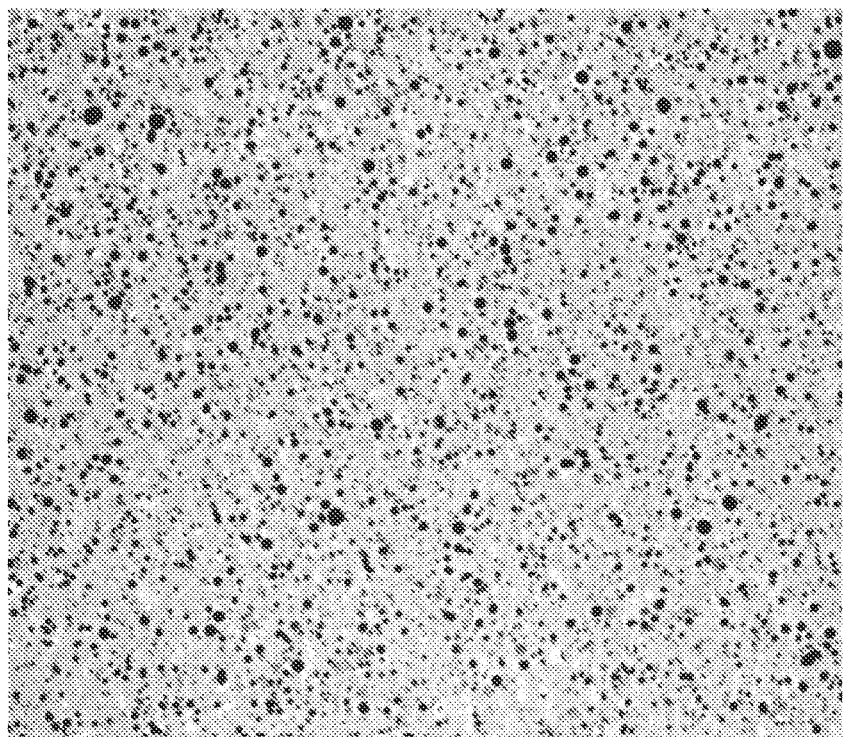
FIG. 5A  5 µm
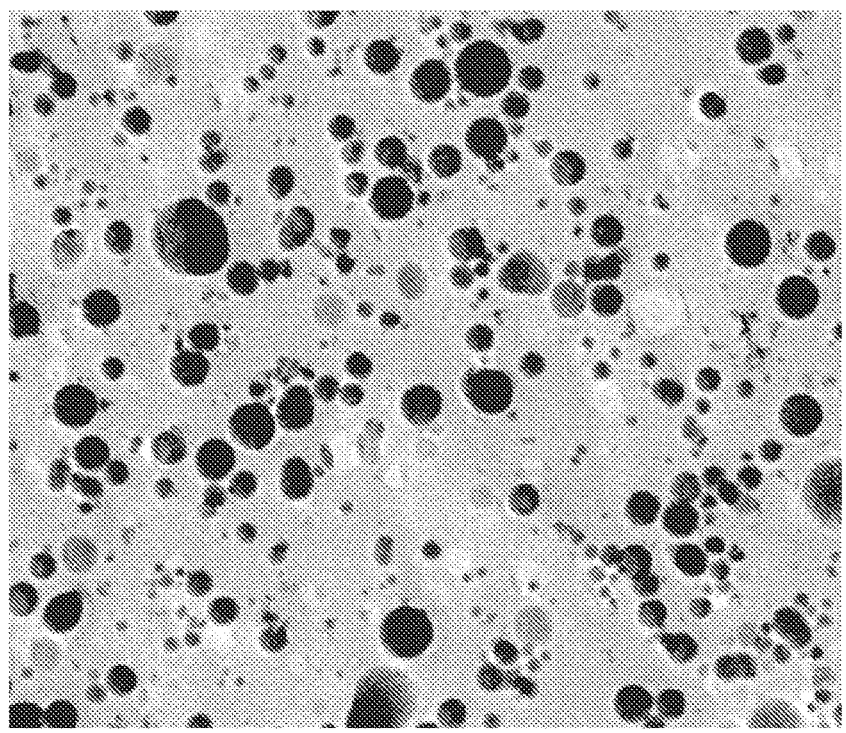
FIG. 5B  1 µm

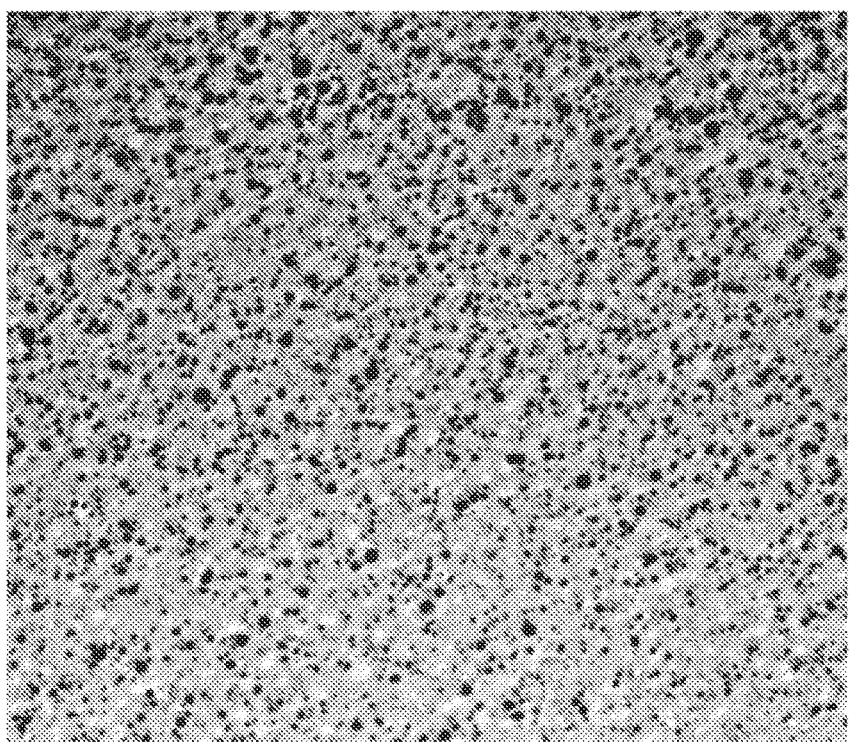
FIG. 6A  5 μm
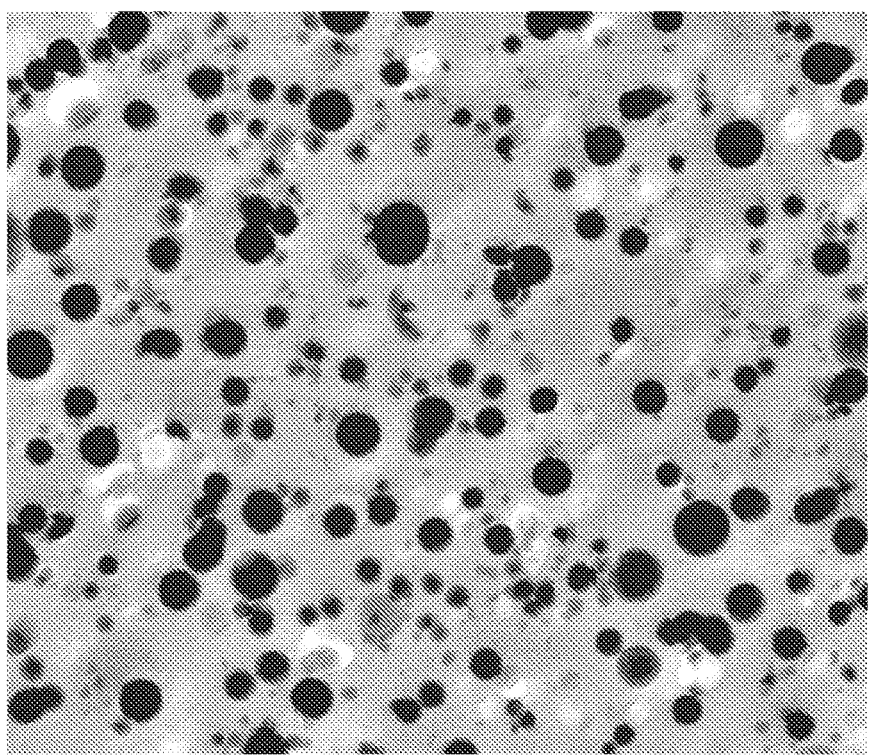
FIG. 6B  1 μm

NANOCOMPOSITES CONTAINING SPHERICAL PYROGENIC SILICA NANOPARTICLES AND COMPOSITES, ARTICLES, AND METHODS OF MAKING SAME

CROSS REFERENCE TO RELATED APPLICATIONS

This application is a national stage filing under 35 U.S.C. 371 of PCT/US2014/050809, filed Aug. 13, 2014, which claims priority to U.S. Application No. 61/865,308, filed Aug. 13, 2013; U.S. Application No. 61/909,575, filed Nov. 27, 2013; U.S. Application No. 61/918,302, filed Dec. 19, 2013; and U.S. Application No. 62/018,993, filed Jun. 30, 2014, the disclosures of which are incorporated by reference in their entirety herein.

TECHNICAL FIELD

The present disclosure relates to nanocomposites, composites, and articles that contain spherical pyrogenic silica nanoparticles, as well as methods of making the same.

BACKGROUND

A persistent issue for nanocomposites, and in turn composites that contain nanoparticles, is cost, including cost associated with the processing steps. One approach to processing nanocomposites is a solvent-based approach where an aqueous dispersion of nanoparticles is the raw material. The dispersion is typically dilute, in which the nanoparticles are present in an amount between about 15-40 weight percent. A solvent, typically a water-miscible solvent, is added in a significant volume ratio with the water in the dispersion, further diluting the nanoparticles. The solvent is typically chosen so that the dispersed state of the nanoparticles is maintained. The solvent further serves to counteract the thickening effect of silica nanoparticles on resin systems. A surface treating agent is typically used to make the nanoparticles more compatible with the matrix resin. The surface treating agent is typically soluble in the water:solvent:nanoparticle dispersion. After completion of the surface treatment process, the modified nanoparticle dispersion is mixed with resin. This is followed by removal of the water and solvent to yield a nanocomposite.

There is a cost associated with the processes of preparing the nanoparticle aqueous dispersion, addition of solvent, surface treatment of the nanoparticles, compounding the nanoparticles into a resin, and removal of the water and solvent to form the nanocomposite. The removal of water and solvent is typically the most expensive of these processes.

SUMMARY

The present disclosure provides nanocomposites and articles that contain silica nanoparticles, and methods of making the nanocomposites and articles, which have decreased cost of materials and processing, as compared to other preparation approaches.

In a first embodiment, the present disclosure provides a nanocomposite including spherical pyrogenic silica nanoparticles dispersed in a curable resin, wherein the nanocomposite contains less than 2% by weight solvent and less than 0.5% by weight dispersant based on the nanoparticle weight.

In a second embodiment, the present disclosure provides a composite including from about 4 to 70 weight percent of spherical pyrogenic silica nanoparticles dispersed in a cured resin, and a filler embedded in the cured resin. The composite contains less than 0.5% by weight dispersant based on the nanoparticle weight. The filler comprises at least one of a reinforcing continuous fiber, reinforcing discontinuous fibers, and hollow glass bubbles.

In a third embodiment, the present disclosure provides an article including from about 10 to about 50 weight percent of spherical pyrogenic silica nanoparticles dispersed in a cured resin. The article contains less than 0.5% by weight dispersant based on the nanoparticle weight.

In a fourth embodiment, the present disclosure provides a method of preparing a nanoparticle-containing curable resin system including mixing from 10 to 70 weight percent of spherical pyrogenic silica nanoparticles with a curable resin, and optionally a catalyst, a diluent, a surface treatment agent, and/or a curing agent, to form a mixture. The mixture contains less than 2% by weight solvent and less than 0.5% by weight dispersant based on the nanoparticle weight. The method further includes milling the mixture in an immersion mill containing milling media to form a milled resin system comprising spherical pyrogenic silica nanoparticles dispersed in the curable resin.

Various unexpected results and advantages are obtained in exemplary embodiments of the disclosure. One such advantage of exemplary embodiments of the present disclosure is the ability to produce low cost, high performance silica nanocomposites and articles. Another potential advantage of exemplary embodiments of the present disclosure is the ability to prepare dispersions of silica nanoparticles in curable resin and/or in a curing agent at high loading amounts without the use of solvents. Another potential advantage of exemplary embodiments of the present disclosure is the ability to prepare dispersions of silica nanoparticles in curable resin without adverse effects between the surface treatment or dispersant and other components of the nanocomposite, composite, or article.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the cited list serves only as a representative group and should not be interpreted as an exclusive list.

BRIEF DESCRIPTION OF THE DRAWINGS

FIG. 2A is a scanning electron microscope (SEM) image of Comparative Example 6a.

FIG. 2B is an SEM image of Comparative Example 6b, having a higher magnification than the SEM image of FIG. 2A.

FIG. 3A is an SEM image of Comparative Example 7b.

FIG. 3B is an SEM image of Comparative Example 7b, having a higher magnification than the SEM image of FIG. 3A.

FIG. 4A is an SEM image of Comparative Example 8b.

FIG. 4B is an SEM image of Comparative Example 8b, having a higher magnification than the SEM image of FIG. 4A.

FIG. 5A is an SEM image of Comparative Example 9b.

FIG. 5B is an SEM image of Comparative Example 9b, having a higher magnification than the SEM image of FIG. 5A.

FIG. 6A is an SEM image of Example 2b.

FIG. 6B is an SEM image of Example 2b, having a higher magnification than the SEM image of FIG. 6A.

DETAILED DESCRIPTION

Figure 1:
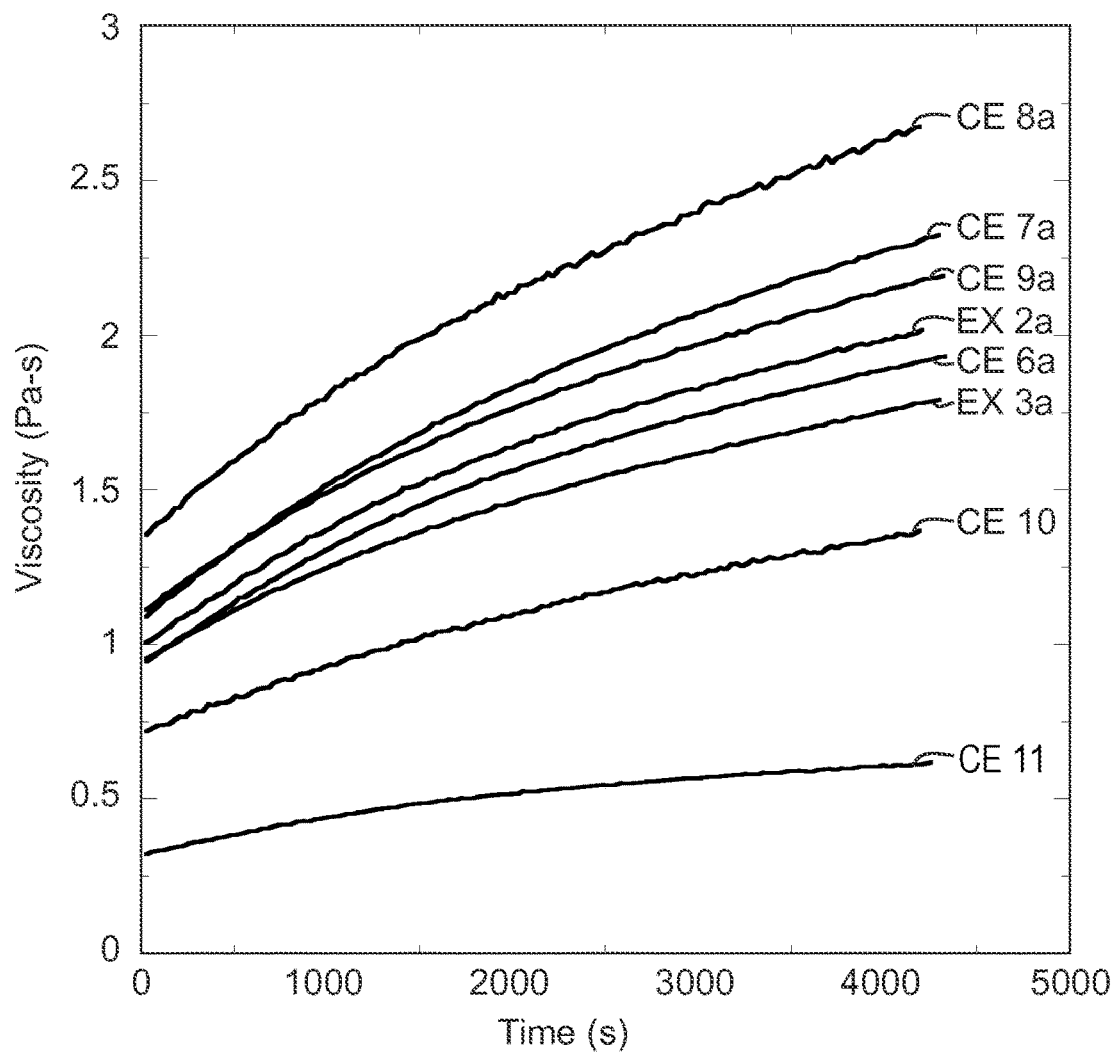
FIG. 1 is a graph presenting viscosity as a function of time at 30° C. and a constant shear rate of 10 $s^{-1}$ for each of Example 2a, Example 3a, Comparative Example 6a, Comparative Example 7a, Comparative Example 8a, and Comparative Example 9a, Comparative Example 10, and Comparative Example 11.

Nanocomposites, composites, and articles are provided that contain spherical pyrogenic silica nanoparticles, as well as methods of making the nanocomposites, composites, and articles. There is a need for a more efficient process for the incorporation of silica nanoparticles into nanocomposites and articles.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

As used in this specification and the appended embodiments, the singular forms "a", "an", and "the" include plural referents unless the content clearly dictates otherwise. Thus, for example, reference to "a compound" includes a mixture of two or more compounds.

As used in this specification and the appended embodiments, the term "or" is generally employed in its sense including "and/or" unless the content clearly dictates otherwise. The term "and/or" means either or both. For example, the expression "A and/or B" means A, B, or a combination of A and B.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

The term "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

The term "nanoparticle" refers to particles that are submicron in size. The nanoparticles have an average particle size, which refers to the average longest dimension of the particles, that is no greater than 1000 nanometers, no greater than 500 nanometers, no greater than 200 nanometers, no greater than 100 nanometers, no greater than 75 nanometers, no greater than 50 nanometers, no greater than 40 nanometers, no greater than 25 nanometers, or no greater than 20 nanometers. The average particle size is often determined using transmission electron microscopy but various light scattering methods (e.g., laser diffraction) can be used as well. The average particle size typically refers to the average size of non-agglomerated and/or non-aggregated single nanoparticles.

The term "agglomerated" refers to a weak association of primary particles or aggregated particles usually held together by charge or polarity. Agglomerated particles can typically be broken down into smaller entities by, for example, shearing forces encountered during dispersion of the agglomerated particles in a liquid.

The terms "aggregated" and "aggregates" refer to a strong association of primary particles often bound together by, for example, residual chemical treatment, covalent chemical bonds, or ionic chemical bonds. Further breakdown of the aggregates into smaller entities is very difficult to achieve.

The term "spherical" means a round body whose surface is at all points equidistant from the center. The term "nonspherical" means any shape other than essentially spherical, including for example and without limitation, cubic, rhombohedral, pyramidal, oval, plate-like, conical, diamond shaped, and acicular, and including regular and/or irregular shapes. For instance, a shape that is at least partially spherical but has portions missing from the sphere is encompassed by the term nonspherical. The term "nonspherical" encompasses a population of clusters of spherical primary nanoparticles (e.g., an aggregate of spherical nanoparticles), wherein the cluster is defined to have any shape other than essentially spherical and is submicron in size. The population of clusters (i.e., the clusters within the population) has a mean size, which refers to the average longest dimension of the clusters of spherical primary nanoparticles, that is no greater than 1000 nanometers, no greater than 500 nanometers, no greater than 200 nanometers, no greater than 100 nanometers, no greater than 75 nanometers, no greater than 50 nanometers, or no greater than 40 nanometers.

As used herein, the term "silica" refers to amorphous silicon dioxide ($SiO_2$). As used herein, the term "pyrogenic" silica refers to silicon dioxide formed in flame or in sufficiently high temperature to decompose organic materials.

As used herein, the term "silica nanoparticle" refers to a nanoparticle having a silica surface. This includes nanoparticles that are substantially, entirely silica, as well nanoparticles comprising other inorganic (e.g., metal oxide) or organic cores having a silica surface. In some embodiments, the core comprises a metal oxide. Any known metal oxide may be used. Exemplary metal oxides include silica, titania, alumina, zirconia, vanadia, chromia, antimony oxide, tin oxide, zinc oxide, ceria, and mixtures thereof.

The term "curable" as used herein means chemically or physically crosslinkable to form a glassy, insoluble, non-flowable network which is maintained under normal use conditions.

The term "cured" as used herein means chemically or physically crosslinked in the form of a glassy, insoluble, non-flowable network which is maintained under normal use conditions.

The term "resin" as used herein means one polymer or at least two polymers blended together, in either solid or molten form.

As used herein, the term "dispersant" means any material (e.g., molecule, polymer, etc.) that assists in separating particles in a resin and/or acts to maintain a dispersion of particles in a resin, with the exclusion of material that is attached to a particle. A material attached to a particle is referred to herein as a "surface treatment agent".

The term "matrix" as used herein in the term "matrix resin" refers to a curable or cured resin into which additional components may be included (e.g., particles, fibers, etc.).

The term "nanocomposite" as used herein refers to a material comprising a curable or cured resin and silica nanoparticles.

The term "composite" as used herein refers to a cured nanocomposite comprising a cured resin, silica nanoparticles, and a filler comprising at least one of a continuous fiber, discontinuous fibers, and hollow glass bubbles. Continuous fibers include for example and without limitation, glass, carbon, basalt, ceramic (e.g., NEXTEL ceramic oxide fibers available from 3M Company (St. Paul, Minn.)), and organic fibers (e.g., aromatic polyamide (e.g., KEVLAR available from DuPont (Wilmington, Del.)), polypropylene, and polyacrylnitrile).

The term "article" as used herein refers to an object comprising a cured nanocomposite comprising a cured resin and spherical pyrogenic silica nanoparticles, and optionally a filler comprising at least one of a reinforcing continuous fiber, reinforcing discontinuous fibers, and hollow glass bubbles (i.e., a composite).

The term "neat" as used herein in the term "neat resin" refers to a curable or cured resin which does not include a macroscopic filler (e.g., continuous or discontinuous fibers, hollow glass bubbles, etc.).

The term "(co)polymer" is inclusive of both homopolymers containing a single monomer and copolymers containing two or more different monomers.

The term "(meth)acrylic" or "(meth)acrylate" is inclusive of both acrylic and methacrylic (or acrylate and methacrylate).

The term "aliphatic group" means a saturated or unsaturated linear or branched hydrocarbon group. This term is used to encompass alkyl, alkenyl, and alkynyl groups, for example.

The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkylene group" refers to a divalent alkyl group.

The term "heteroalkyl group" means an alkyl group having at least one —CH$_2$— replaced with a heteroatom such as O or S. In many embodiments, the heteroalkyl group is a monovalent polyether group. The term "heteroalkylene group" refers to a divalent heteroalkyl group. In many embodiments, the heteroalkylene group is a divalent polyether group.

The term "alicyclic group" means a cyclic hydrocarbon group having properties resembling those of aliphatic groups. The term "aromatic group" or "aryl group" means a mono- or polynuclear aromatic hydrocarbon group.

The term "unsaturation" means either a double bond between two atoms (e.g., C═C), or a triple bond between two atoms (e.g., C≡C).

When a group is present more than once in a formula described herein, each group is "independently" selected, whether specifically stated or not. For example, when more than one R group is present in a formula, each R group is independently selected.

The term "component" refers to any compound (e.g., any reactant), heterogeneous catalyst, solvent, or other material, which is present in a reactor.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," "in many embodiments" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

Various exemplary embodiments of the disclosure will now be described. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

Thus, in a first exemplary embodiment, the disclosure provides a nanocomposite comprising spherical pyrogenic silica nanoparticles dispersed in a curable resin; wherein the nanocomposite comprises less than 2% by weight solvent, and wherein the nanocomposite contains less than 0.5% by weight dispersant based on the nanoparticle weight. Preferably, the nanocomposite comprises less than 0.5% by weight solvent, or even more preferably the nanocomposite comprises essentially no solvent.

In a second exemplary embodiment, the disclosure provides a composite comprising from about 4 to 70 weight percent of spherical pyrogenic silica nanoparticles dispersed in a cured resin, and a filler embedded in the cured resin, wherein the composite contains less than 0.5% by weight dispersant based on the nanoparticle weight. The filler comprises at least one of a reinforcing continuous fiber, reinforcing discontinuous fibers, and hollow glass bubbles. In certain embodiments, an article is provided comprising the composite.

In a third exemplary embodiment, the present disclosure provides an article comprising from about 10 to about 50 weight percent of spherical pyrogenic silica nanoparticles dispersed in a cured resin, wherein the article contains less than 0.5% by weight dispersant based on the nanoparticle weight.

In a fourth exemplary embodiment, the present disclosure provides a method of preparing a nanoparticle-containing curable resin system comprising mixing from 10 to 70 weight percent of aggregated spherical pyrogenic silica nanoparticles with a curable resin and optionally a catalyst, a diluent, a surface treatment agent, and/or a curing agent, to form a mixture comprising less than 2% by weight solvent, wherein the mixture includes less than 0.5% by weight dispersant based on the nanoparticle weight; and milling the mixture in an immersion mill containing milling media to form a milled resin system comprising spherical pyrogenic silica nanoparticles dispersed in the curable resin.

Accordingly, in a third exemplary embodiment, an article is provided comprising a nanocomposite comprising from about 10 to about 50 weight percent of spherical pyrogenic silica nanoparticles dispersed in a cured resin. In certain aspects, the article contains from about 10 to about 40 weight percent, or from about 10 to about 30 weight percent, or from about 15 to about 30 weight percent, or from about 15 to about 50 weight percent, or from about 20 to about 50 weight percent, or from about 25 to about 50 weight percent of spherical pyrogenic silica nanoparticles.

In certain embodiments, the nanocomposite or article further comprises one or more additional components (i.e., processing aids), for example and without limitation, catalysts, surface treatment agents, reactive diluents, curing agents, cure accelerators, defoamers, air release agents, crosslinking agents, dyes, flame retardants, pigments, impact modifiers, and flow control agents.

Silica nanoparticles (both spherical and nonspherical) often have an average width (diameter for spherical nanoparticles and smallest dimension for nonspherical nanoparticles) equal to at least 1 nanometer, at least 2 nanometers, or at least 5 nanometers. The average width of silica nanoparticles is often no greater than 600 nanometers, no greater than 500 nanometers, no greater than 250 nanometers, no greater than 100 nanometers, or no greater than 50 nanometers. The nonspherical silica nanoparticles will have a different length than width, and can have an average length D1 measured by dynamic light scattering methods that is, for example, at least 25 nanometers, at least 50 nanometers, at least 75 nanometers, or at least 100 nanometers. The average length D1 (e.g., longer dimension) can be up to 200 nanometers, up to 400 nanometers, or up to 500 nanometers. Acicular nonspherical silica particles may have an elongation ratio D1/D2 in a range of 5 to 30, wherein D2 means a diameter in nanometers calculated by the equation D2=2720/S and S means specific surface area in meters squared per gram (m$^2$/gram) of the nanoparticle, as described in U.S. Pat. No. 5,221,497 (Watanabe et al.).

In certain embodiments, the spherical pyrogenic silica nanoparticles are selected to have an average specific surface area equal up to 400 m$^2$/gram, up to 300 m$^2$/gram, up to 250 m$^2$/gram, up to 200 m$^2$/gram, up to 150 m$^2$/gram, up to 100 m$^2$/gram, up to 50 m$^2$/gram, or even up to 20 m$^2$/gram.

The spherical pyrogenic silica nanoparticles typically comprise an average particle size (e.g., diameter) in the range from about 1 nanometer to about 1000 nanometers, or from about 1 nanometer to about 500 nanometers, or from about 1 nanometer to about 100 nanometers, or from about 1 nanometer to about 50 nanometers, or from about 100 nanometers to about 400 nanometers, or from about 500 nanometers to about 1000 nanometers.

In certain embodiments, mixtures of spherical silica nanoparticles and nonspherical silica nanoparticles are employed. For instance, suitable mixtures of spherical silica nanoparticles and nonspherical silica nanoparticles have a weight ratio of 10:1, or 7:1, or 5:1, or 4:1, or 3:1, or 2:1, or even 1:1 spherical silica nanoparticles to nonspherical silica nanoparticles. Example nonspherical silica powder is available under the trade designations TIXOSIL (e.g., TIXOSIL 68) from Rhodia (Bristol, Pa.), SIPERNAT (e.g., SIPERNAT 33) from Evonik Degussa Corporation (Parsippany, N.Y., USA), ZEOFREE (e.g., ZEOFREE 80) from Huber Engineered Materials (Atlanta, Ga., USA), HI-SIL (e.g., HI-SIL T-800) from PPG Industries (Pittsburgh, Pa.), and SYLOID (e.g., SYLOID 244) from W.R. Grace and Company (Columbia, Md., USA). In aspects including a mixture of spherical silica nanoparticles and nonspherical silica nanoparticles, a bimodal particle size distribution of silica nanoparticles is provided.

In some embodiments, the silica nanoparticle cores have a narrow particle size distribution. In some embodiments, the core is substantially fully condensed. In some embodiments, the core is amorphous. In some embodiments, the core is isotropic. In some embodiments, the silica nanoparticles are substantially non-agglomerated.

The silica particles to be included in a nanocomposite are typically commercially available in the form of a dry silica microparticle powder. Example spherical pyrogenic silica is available under the trade designation NANOSIL (e.g., NANOSIL ASD) from Energy Strategy Associates, Inc. (Old Chatham, N.Y.).

In certain embodiments, the nanocomposite, composite, or article comprises from about 4 to about 70 weight percent of the spherical pyrogenic silica nanoparticles, or from about 6 to about 30 weight percent, or from about 10 to about 30 weight percent, or from about 10 to about 50 weight percent, or from about 10 to about 70 weight percent, or from about 15 to about 30 weight percent, or from about 15 to about 50 weight percent, or from about 20 to about 50 weight percent, or from about 25 to about 50 weight percent, or from about 15 to about 70 weight percent, or from about 20 to about 70 weight percent, or from about 25 to about 70 weight percent, or from about 35 to about 70 weight percent, or from about 50 to about 70 weight percent of the spherical pyrogenic silica nanoparticles, such as about 50 weight percent of the spherical pyrogenic silica nanoparticles. In an aspect, the nanocomposite consists essentially of the spherical pyrogenic silica nanoparticles dispersed in the curable resin. In a related aspect, the nanocomposite consists essentially of about 20 to about 70 weight percent of the spherical pyrogenic silica nanoparticles dispersed in the curable resin, and the nanocomposite comprises a viscosity of 1 to 100 Pa·s as measured according to ASTM D2196 at 30 degrees Celsius a constant shear rate of 1 s$^{-1}$. In another related aspect, the nanocomposite consists essentially of about 15 to about 30 weight percent of the spherical pyrogenic silica nanoparticles dispersed in the curable resin, and the nanocomposite comprises a viscosity of 1 to 70 Pa·s as measured according to ASTM D2196 at 30 degrees Celsius and a constant shear rate of 1 s$^{-1}$. In an aspect, the composite consists essentially of the spherical pyrogenic silica nanoparticles dispersed in the cured resin and the filler embedded in the cured resin. In an aspect, the article consists essentially of the spherical pyrogenic silica nanoparticles dispersed in the cured resin, such as about 10 to about 50 weight percent of spherical pyrogenic silica nanoparticles.

Nanoparticles, including surface-modified nanoparticles, have been compounded into curable resins to alter the properties of the resulting cured resin system. For example, U.S. Pat. No. 5,648,407 (Goetz et al.) describes, among other things, curable resins comprising colloidal microparticles in curable resin, and the use of such particle-containing resins in combination with reinforcing fibers. International Patent Publication No. WO2008/027979 (Goenner et al.) describes, among other things, resin systems comprising one or more crosslinkable resins, one or more reactive diluents, and a plurality of reactive, surface-modified nanoparticles.

Traditionally, nanoparticles have been compounded into resins using a combination of solvent exchange and solvent stripping processes. In addition to being time-consuming and requiring the use of multiple solvents, such processes often expose the curable resins to high temperatures. Such high temperatures can lead to oligomerization and other undesirable reactions during the compounding process with a resultant increase in viscosity. In addition, low-boiling-temperature components (e.g., volatile reactive diluents) may be lost during these compounding steps.

Moreover, prior to solvent stripping, silica nanoparticle dispersions typically contain only about 20% by weight nanoparticles, thus to make a concentrated (e.g., 50 wt. %) nanocomposite is difficult, particularly when employing a batch process requiring a large volume stripping unit to contain the feed, 80 vol. % of which is waste (e.g., water and solvent).

The present disclosure provides alternative procedures for combining nanoparticles, including agglomerated nanoparticles, into a curable resin. These procedures do not require the use of solvents and may be used to compound curable resins without causing premature cure.

Silica particles are typically included in resin systems as thickeners; generally, the smaller the particle size, the greater the increase in viscosity of the silica particle-containing resin. Such thickening effects can be observed at silica particle loadings of as little as 3 weight percent (wt. %), 2 wt. %, or even 1 wt. %. Typically, a loading of about 10 weight percent or more silica microparticles or silica nanoparticles in resin poses challenges with respect to effective dispersion of the particles within the resin. For example, high resin system viscosities (e.g., greater than about 1,000 centipoises (cP), or greater than about 5,000 cP) inhibits dispersion of silica particles into a resin system according to usual methods. In contrast to prior systems, embodiments of the nanocomposites, articles, and methods of the present disclosure achieve dispersion of silica particles at high loadings (e.g., at least 4 wt. %, at least 6 wt. %, at least 8 wt. %, at least 10 wt. %, at least 12 wt. %, at least 15 wt. %, at least 20 wt. %, at least 25 wt. %, at least 30 wt. %, at least 35 wt. %, at least 40 wt. %, at least 45 wt. %, at least 50 wt. %, at least 55 wt. %, at least 60 wt. %, or at least 65 wt. %) without requiring the use of solvents to decrease the viscosity of the resin system. Similarly, embodiments of the nanocomposites, articles, and methods of the present disclosure achieve dispersion of silica particles at high loadings without requiring a pretreatment of the silica particles with surface treatment agents to improve the compatibility of the silica particles with the specific resin(s) of the resin system.

Generally, curable resin systems are used in a wide variety of applications, e.g., as a protective layer (e.g., gel coats) and as the impregnation resin in composites. Advanced structural composites, for example, are high strength materials having any of standard modulus, intermediate modulus, or high modulus, that are useful in many applications requiring high strength to weight ratios, e.g., applications in the automotive, sporting goods, and aerospace industries. Exemplary composites include for example and without limitation, a turbine blade, golf club, a baseball bat, a fishing rod, a racquet, a bicycle frame, a pressure vessel (e.g., a container having pressurized contents), an aerospace part (e.g., an exterior panel of an airplane), and a cable (e.g., a hoist cable, an underwater tether, an umbilical cable, and the like). Such composites typically comprise reinforcing fibers (e.g., carbon or glass) embedded in a cured matrix resin. Resin systems are often selected based on the desired mechanical properties of the final product including, e.g., hardness, toughness, fracture resistance, and the like. In some applications, the optical appearance of the finished product may be important such that properties like clarity and haze must be considered. In addition, process conditions to prepare the composite structure may lead to preferred ranges for properties such as viscosity. Finally, the desired end use of the product often leads to additional requirements, e.g., erosion resistance or anti-blistering.

Curable resins suitable for use in the nanocomposites of the invention are those resins, e.g., thermosetting resins and radiation-curable resins, which are capable of being cured to form a glassy network polymer. Suitable resins include, e.g., epoxy resins, curable imide resins (especially maleimide resins, but also including, e.g., commercial K-3 polyimides (available from DuPont) and polyimides having a terminal reactive group such as acetylene, diacetylene, phenylethynyl, norbornene, nadimide, or benzocyclobutane), vinyl ester resins and acrylic resins (e.g., (meth)acrylic esters or amides of polyols, epoxies, and amines), bisbenzocyclobutane resins, polycyanate ester resins, and mixtures thereof. The resins can be utilized in the form of either monomers or prepolymers. Preferred curable resins include epoxy resins, maleimide resins, polycyanate ester resins, and mixtures thereof. Epoxy resins are especially preferred due to their processing characteristics, high temperature properties, and environmental resistance.

Epoxy resins are well-known in the art and comprise compounds or mixtures of compounds which contain one or more epoxy groups of the structure

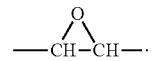

The compounds can be saturated or unsaturated, aliphatic, alicylic, aromatic, or heterocyclic, or can comprise combinations thereof. Compounds which contain more than one epoxy group (i.e., polyepoxides) are preferred.

Polyepoxides which can be utilized in the nanocomposites of the invention include, e.g., both aliphatic and aromatic polyepoxides, but aromatic polyepoxides are preferred for high temperature applications. The aromatic polyepoxides are compounds containing at least one aromatic ring structure, e.g. a benzene ring, and more than one epoxy group. Preferred aromatic polyepoxides include the polyglycidyl ethers of polyhydric phenols (e.g., bisphenol A derivative resins, epoxy cresol-novolac resins, bisphenol F derivative resins, epoxy phenol-novolac resins), glycidyl esters of aromatic carboxylic acids, and glycidyl amines of aromatic amines. The most preferred aromatic polyepoxides are the polyglycidyl ethers of polyhydric phenols.

Representative examples of aliphatic polyepoxides which can be utilized in the nanocomposites of the invention include 3',4'-epoxycyclohexylmethyl-3,4-epoxycyclohexanecarboxylate, 3,4-epoxycyclohexyloxirane, 2-(3',4'-epoxycyclohexyl)-5,1"-spiro-3",4"-epoxycyclohexane-1,3-dioxane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3, 4-epoxycyclohexyl)propane, polyglycidyl ethers of aliphatic polyols such as glycerol or hydrogenated 4,4'-dihydroxydiphenyl-dimethylmethane, and mixtures thereof.

Representative examples of aromatic polyepoxides which can be utilized in the nanocomposites of the invention include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-[4-(2,3-epoxypropoxy)phenyl]propane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. No. 3,018,262 (Schoeder) and U.S. Pat. No. 3,298,998 (Coover et al.), the descriptions of which are incorporated herein by reference, as well as the derivatives described in the Handbook of Epoxy Resins by Lee and Neville, McGraw-Hill Book Co., New York (1967) and in Epoxy Resins, Chemistry and Technology, Second Edition, edited by C. May, Marcel Dekker, Inc., New York (1988), and mixtures thereof. A preferred class of polyglycidyl ethers of polyhydric phenols for use in the nanocomposites of the invention is the diglycidyl ethers of bisphenol that have pendant carbocyclic groups, e.g., those described in U.S. Pat. No. 3,298,998 (Coover et al.), the description of which is incorporated herein by reference. Examples of such compounds include 2,2-bis[4-(2,3-epoxypropoxy)phenyl]norcamphane and 2,2-bis[4-(2,3-epoxypropoxy)phenyl]decahydro-1,4,5,8-dimethanonaphthalene. A preferred compound is 9,9-bis[4-(2,3-epoxypropoxy)phenyl]fluorene.

Suitable epoxy resins can be prepared by, e.g., the reaction of epichlorohydrin with a polyol, as described, e.g., in U.S. Pat. No. 4,522,958 (Das et al.), the description of which is incorporated herein by reference, as well as by other methods described by Lee and Neville and by May, supra. Many epoxy resins are also commercially available.

Maleimide resins suitable for use in the nanocomposites of the invention include bismaleimides, polymaleimides, and polyaminobismaleimides. Such maleimides can be conveniently synthesized by combining maleic anhydride or substituted maleic anhydrides with di- or polyamine(s). Preferred are N,N'-bismaleimides, which can be prepared, e.g., by the methods described in U.S. Pat. No. 3,562,223 (Bargain et al.), U.S. Pat. No. 3,627,780 (Bonnard et al.), U.S. Pat. No. 3,839,358 (Bargain), and U.S. Pat. No. 4,468,497 (Beckley et al.) (the descriptions of which are incorporated herein by reference) and many of which are commercially available.

Representative examples of suitable N,N'-bismaleimides include the N,N'-bismaleimides of 1,2-ethanediamine, 1,6-hexanediamine, trimethyl-1,6-hexanediamine, 1,4-benzenediamine, 4,4'-methylenebisbenzenamine, 2-methyl-1,4-benzenediamine, 3,3'-methylenebisbenzenamine, 3,3'-sulfonylbisbenzenamine, 4,4'-sulfonylbisbenzenamine, 3,3'-oxybisbenzenamine, 4,4'-oxybisbenzenamine, 4,4'-methylenebiscyclohexanamine, 1,3-benzenedimethanamine, 1,4-benzenedimethanamine, 4,4'-cyclohexanebisbenzenamine, and mixtures thereof.

Co-reactants for use with the bismaleimides can include any of a wide variety of unsaturated organic compounds, particularly those having multiple unsaturation, either ethylenic, acetylenic, or both. Examples include acrylic acids and amides and the ester derivatives thereof, e.g., acrylic acid, methacrylic acid, acrylamide, methacrylamide, and methylmethacrylate; dicyanoethylene; tetracyanoethylene; allyl alcohol; 2,2'-diallylbisphenol A; 2,2'-dipropenylbisphenol A; diallylphthalate; triallylisocyanurate; triallylcyanurate; N-vinyl-2-pyrrolidinone; N-vinyl caprolactam; ethylene glycol dimethacrylate; diethylene glycol dimethacrylate; trimethylolpropane triacrylate; trimethylolpropane trimethacrylate; pentaerythritol tetramethacrylate; 4-allyl-2-methoxyphenol; triallyl trimellitate; divinyl benzene; dicyclopentadienyl acrylate; dicyclopentadienyloxyethyl acrylate; 1,4-butanediol divinyl ether; 1,4-dihydroxy-2-butene; styrene; .alpha.-methyl styrene; chlorostyrene; p-phenylstyrene; p-methylstyrene; t-butylstyrene; and phenyl vinyl ether. Of particular interest are resin systems employing a bismaleimide in combination with a bis(alkenylphenol). Descriptions of a typical resin system of this type are found in U.S. Pat. No. 4,100,140 (Zahir et al.), the descriptions of which are incorporated herein by reference. Particularly preferred components are 4,4'-bismaleimidodiphenylmethane and o,o'-diallylbisphenol A.

Polycyanate ester resins suitable for use in the nanocomposites of the invention can be prepared by combining cyanogen chloride or bromide with an alcohol or phenol. The preparation of such resins and their use in polycyclotrimerization to produce polycyanurates are described in U.S. Pat. No. 4,157,360 (Chung et al.), the descriptions of which are incorporated herein by reference. Representative examples of suitable polycyanate ester resins include 1,2-dicyanatobenzene, 1,3-dicyanatobenzene, 1,4-dicyanatobenzene, 2,2'-dicyanatodiphenylmethane, 3,3'-dicyanatodiphenylmethane, 4,4'-dicyanatodiphenylmethane, and the dicyanates prepared from biphenol A, bisphenol F, and bisphenol S. Tri- and higher functionality cyanate resins are also suitable.

In some embodiments, the curable resin may be an ethylenically-unsaturated curable resin. For example, in some embodiments, an unsaturated polyester resin may be used. In some embodiments, the unsaturated polyester resin is the condensation product of one or more carboxylic acids or derivatives thereof (e.g., anhydrides and esters) with one or more alcohols (e.g., polyhydric alcohols).

In other embodiments, vinyl ester resins are used. As used herein, the term "vinyl ester" refers to the reaction product of epoxy resins with ethylenically-unsaturated monocarboxylic acids. Exemplary epoxy resins include bisphenol A digycidyl ether (e.g., EPON 828, available from Hexion Specialty Chemicals, Columbus, Ohio). Exemplary monocarboxylic acids include acrylic acid and methacrylic acid. Although such reaction products are acrylic or methacrylic esters, the term "vinyl ester" is used consistently in the gel coat industry. (See, e.g., Handbook of Thermoset Plastics (Second Edition), William Andrew Publishing, page 122 (1998).)

In still other embodiments, (meth)acrylate resins, including, e.g., urethane (meth)acrylates, polyethyleneglycol (multi)(meth)acrylates, and epoxy (multi)(meth)acrylates may be used. In other embodiments, direct milling into epoxy resins may be achieved. Epoxy resins may contain diluents such as hexanedioldiglycidyl ether.

Depending on the selection of the curable resin, in some embodiments, the resin system may also include a reactive diluent. Exemplary reactive diluents include styrene, alpha-methylstyrene, vinyl toluene, divinylbenzene, triallyl cyanurate, methyl methacrylate, diallyl phthalate, ethylene glycol dimethacrylate, hydroxyethyl methacrylate, hydroxyethyl acrylate, and other mono- and multi-functional (meth)acrylates.

In certain embodiments of the nanocomposite, the curable resin comprises an epoxy resin, a curable imide resin, a vinyl ester resin, an acrylic resin, a bisbenzocyclobutane resin, a polycyanate ester resin, or a mixture thereof. In an embodiment, the curable resin comprises an epoxy resin, a maleimide resin, a polycyanate ester resin, or a mixture thereof. In an embodiment, the curable resin comprises an epoxy resin or a mixture of epoxy resins. In an embodiment, the curable resin comprises a digycidyl ether of bisphenol A, a diglycidyl ether of bisphenol F, ethylidene bis-4,1-phenylene dicyanate, N,N'-4,4'-diphenylmethanebismaleimide, 4,4'-(1-methylethylidene)bis(2-(2-propenyl)phenol), or a mixture thereof.

Similarly, in certain embodiments of the article, the cured resin comprises an epoxy resin, a cured imide resin, a vinyl ester resin, an acrylic resin, a bisbenzocyclobutane resin, a polycyanate ester resin, or a mixture thereof. Such resins are discussed in detail above. In an embodiment, the cured resin comprises an epoxy resin, a maleimide resin, a polycyanate ester resin, or a mixture thereof. In an embodiment, the cured resin comprises an epoxy resin or a mixture of epoxy resins. In an embodiment, the cured resin comprises a digycidyl ether of bisphenol A, a diglycidyl ether of bisphenol F, ethylidene bis-4,1-phenylene dicyanate, N,N'-4,4'-diphenylmethanebismaleimide, 4,4'-(1-methylethylidene)bis(2-(2-propenyl)phenol), or a mixture thereof.

Advantageously, the nanocomposite, composite, or article includes less than 0.5% by weight of one or more dispersants based on the nanoparticle weight, or less than 0.4% by weight, or less than 0.3% by weight, or less than 0.2% by weight, or less than 0.1% by weight, or no added dispersant. It has been discovered that it is possible to disperse spherical pyrogenic silica nanoparticles in curable resin without requiring the presence of a dispersant to be able to successfully mill a mixture of aggregated spherical pyrogenic silica nanoparticles with a curable resin, for instance in an immersion mill.

Suitable dispersants, if present at all, include for example and without limitation, a copolymer comprising acidic groups, for instance BYK W9010, BYK 180, which is an alkylol ammonium salt of a copolymer with acid groups, a phosphoric acid polyester dispersant, and BYK 2152, which is a hyperbranched high molecular weight polyester dispersant. Each of the BYK dispersants is commercially available from BYK USA, Inc. (Wallingford, Conn.). A further suitable dispersant is a nonionic polymeric polyester copolymer, for instance ZEPHRYM PD 2246, which is commercially available from Croda, Inc. (Edison, N.J.). Another suitable dispersant is a slightly anionic polymeric polyester having part acid functionality, for instance ZEPHRYM PD 1000, which is commercially available from Croda, Inc. (Edison, N.J.). An additional suitable dispersant is an acrylic polymer salt, for example SOLPLUS D570, which is commercially available from Lubrizol Additives (Wickliffe, Ohio). Another suitable dispersant is a Jeffamine sulfonate, the sulfonic acid ligand containing JEFFAMINE M-6000 (commercially available from Huntsman Corporation, (The Woodlands, Tex.)) reacted with propane sulfone, as described in International Patent Publication No. WO 2010/080459 (Schultz et al.). Other suitable dispersants include polymeric dispersants commercially available under the trade designations SOLPLUS D510 (available from Lubrizol Additives (Wickliffe, Ohio). If present at all, the polymeric dispersants are typically added to the nanocomposite at the same time as the aggregated silica nanoparticles and curable resin. High molecular weight dispersants are polymeric and usually have weight average molecular weights (Mw) of greater than 1000 gm/mole, or even greater than 2000 gm/mole. In certain embodiments, such dispersants are crosslinkable.

Nanocomposites comprising spherical pyrogenic silica nanoparticles dispersed in a curable resin typically comprise a viscosity of 1 to 150 Pascals·second (Pa·s), inclusive, as measured according to ASTM D2196 at 30 degrees Celsius and shear rate of $1\ s^{-1}$, such as a viscosity of 1 to 100 Pa·s, inclusive, or 1 to 90 Pa·s, inclusive, or 1 to 80 Pa·s, inclusive, or 1 to 70 Pa·s, or 1 to 60 Pa·s, inclusive, as measured according to ASTM D2196 at 30 degrees Celsius and shear rate of $1\ s^{-1}$. In certain embodiments, the nanocomposite comprises from about 15 to about 30 weight percent of the silica nanoparticles and comprises a viscosity of 1 to 70 Pa·s, inclusive, or the nanocomposite comprises from about 20 to about 70 weight percent of the silica nanoparticles and comprises a viscosity of 1 to 100 Pa·s, inclusive (as measured according to ASTM D2196 at 30 degrees Celsius and shear rate of $1\ s^{-1}$).

In an embodiment, the nanocomposite, composite, or article includes one or more catalysts for reacting silanol groups on the surface of the silica nanoparticles with the curable resin system. Suitable catalysts include for instance stannous chloride ($SnCl_2$) and methylethylketone peroxide.

In an embodiment, the nanocomposite, composite, or article includes one or more defoamers for acting as a defoamer and/or as an entrapped air release agent. Suitable defoamers include for instance BYK-1790 and BYK-A 535, silicone-free polymeric defoamers, and BYK-A500 air release additives, commercially available from BYK USA, Inc. (Wallingford, Conn.).

Generally, "surface modified nanoparticles" comprise surface treatment agents attached to the surface of a nanoparticle. Advantageously, according to methods of the present disclosure, it is not necessary to modify the surface of silica nanoparticles in a separate step, prior to incorporating the nanoparticles into the nanocomposite. Surface treatment agents can simply be added to the nanocomposite and mixed in with the curable resin and silica nanoparticles, treating the surfaces of the silica nanoparticles during the dispersion of the silica nanoparticles in the curable resin.

In many embodiments, a surface treatment agent is an organic species having a first functional group capable of chemically attaching (e.g., covalently or ionically bonding) or physically attaching (e.g., strong physisorptively attaching) to the surface of a nanoparticle, wherein the attached surface treatment agent alters one or more properties of the nanoparticle. In some embodiments, covalently-bonded surface treatment agents may be preferred. In some embodiments, surface treatment agents have no more than three functional groups for attaching to the core. In some embodiments, the surface treatment agents have a low molecular weight, e.g. a weight average molecular weight less than 1000 grams per mole. In some embodiments, the surface treatment agent is an organosilane (e.g., alkyl chlorosilanes, trialkoxy arylsilanes, or trialkoxy alkylsilanes) or a compound having oxirane groups. Exemplary surface treatment agents include methacryloxypropyltrimethoxysilane, phenyl trimethoxysilane, 3-(trimethoxysilyl)propyl methacrylate)

polyethyleneglycol(trimethoxy)silane benzooxasilepin dimethyl ester, phenethyltrimethoxysilane, N-phenylaminopropyl trimethoxysilane, diglycidylether of bisphenol-A, glycidylmethacrylate, allylglycidylether, or combinations thereof.

In some embodiments, the surface treatment agent further includes one or more additional functional groups providing one or more additional desired properties. For example, in some embodiments, an additional functional group may be selected to provide a desired degree of compatibility between the surface modified nanoparticles and one or more of the additional constituents of the resin system, e.g., one or more of the curable resins and/or diluents. In some embodiments, an additional functional group may be selected to modify the rheology of the resin system, e.g., to increase or decrease the viscosity, or to provide non-Newtonian rheological behavior, e.g., thixotropy (shear-thinning) In an embodiment, the silica nanoparticles comprise treated surfaces, for example silica nanoparticle surfaces treated with an organosilane, a monohydric alcohol, or a polyol.

In some embodiments, the surface-modified nanoparticles are reactive; that is, at least one of the surface treatment agents used to surface modify the nanoparticles of the present disclosure may include a second functional group capable of reacting with one or more of the curable resin(s) and/or one or more reactive diluent(s) present in the nanocomposite.

In an embodiment, the nanocomposite, composite, or article includes at least one diluent, including at least one reactive diluent. Suitable diluents include, a polyfunctional glycidyl ether, styrene, mono- and multi-functional (meth)acrylates, or combinations thereof. Some exemplary suitable diluents include for example and without limitation dicyclopentenyloxyethyl methacrylate, alpha-methylstyrene, vinyl toluene, divinylbenzene, triallyl cyanurate, methyl methacrylate, diallyl phthalate, ethylene glycol dimethacrylate, hydroxyethyl methacrylate, hydroxyethyl acrylate. Other suitable reactive diluents for epoxy resins include for example mono- and multi-functional, aliphatic and aromatic, glycidyl ethers including, e.g., some of those available under the trade name HELOXY from Hexion Specialty Chemicals, Columbus, Ohio. Exemplary reactive diluents include, e.g., polypropylene glycol diglycidyl ether, allyl glycidyl ether, trimethylol propane trigylcidyl ether, 1,4-butane diol diglycidyl ether, neopentyl glycol diglycidyl ether, n-butyl glycidyl ether, 2-ethylhexyl glycidyl ether, p-tertiary butyl phenyl glycidyl ether, phenyl glycidyl ether, and cyclohexane dimethanol diglycidyl ether.

In certain embodiments, the nanocomposite, composite, or article includes a curing agent. Typically, the curing agent comprises an amine curing agent, an anhydride curing agent, a dicyandiamide curing agent, or a combination thereof. More particularly, in an aspect, the curing agent comprises an amine curing agent. In an aspect, the curing agent comprises an anhydride curing agent. In an aspect, the curing agent comprises a dicyandiamide curing agent. In an aspect, the curing agent comprises a mixed curing agent. A suitable amine curing agent includes for instance EPIKURE 3230 (commercially available from Momentive Performance Materials Inc. (Albany, N.Y.)) and a suitable anhydride curing agent includes for example LINDRIDE 36 series, LINDRIDE 35 series, LINDRIDE 65 series, LINDRIDE 32 series, LINDRIDE 62 series, LINDRIDE 52 series, and LINDRIDE 22 series (commercially available from Lindau Chemicals Inc. (Columbia S.C.)).

Epoxy resins can be cured by a variety of curing agents, some of which are described (along with a method for calculating the amounts to be used) by Lee and Neville in Handbook of Epoxy Resins, McGraw-Hill, pages 36-140, New York (1967). Useful epoxy resin curing agents include polyamines such as ethylenediamine, diethylenetriamine, aminoethylethanolamine, and the like, diaminodiphenylsulfone, 9,9-bis(4-aminophenyl)fluorene, 9,9-bis(3-chloro-4-(aminophenyl)fluorene, amides such as dicyandiamide, polycarboxylic acids such as adipic acid, acid anhydrides such as phthalic anhydride and chlorendic anhydride, and polyphenols such as bisphenol A, and the like. Generally, the epoxy resin and curing agent are used in stoichiometric amounts, but the curing agent can be used in amounts ranging from about 0.1 to 1.7 times the stoichiometric amount of epoxy resin.

Thermally-activated catalytic agents, e.g., Lewis acids and bases, tertiary amines, imidazoles, complexed Lewis acids, and organometallic compounds and salts, can also be utilized in curing epoxy resins. Thermally-activated catalysts can generally be used in amounts ranging from about 0.05 to about 7 percent by weight, based on the amount of epoxy resin present in the curable resin nanocomposite.

N,N'-bismaleimide resins can be cured using diamine curing agents, such as those described in U.S. Pat. No. 3,562,223 (Bargain et al.), the description of which is incorporated herein by reference. Generally, from about 0.2 to about 0.8 moles of diamine can be used per mole of N,N'-bismaleimide. N,N'-bismaleimides can also cure by other mechanisms, e.g., co-cure with aromatic olefins (such as bis-allylphenyl ether, 4,4'-bis(o-propenylphenoxy)benzophenone, or o,o'-diallylbisphenol A) or thermal cure via a self-polymerization mechanism.

Polycyanate resins can be cyclotrimerized by application of heat and/or by using catalysts such as zinc octoate, tin octoate, zinc stearate, tin stearate, copper acetylacetonate, and chelates of iron, cobalt, zinc, copper, manganese, and titanium with bidentate ligands such as catechol. Such catalysts can generally be used in amounts of from about 0.001 to about 10 parts by weight per 100 parts of polycyanate ester resin.

In certain embodiments, the nanocomposite or article further comprises reinforcing fibers, and optionally the reinforcing fibers are continuous. Suitable reinforcing fibers include for example and without limitation, carbon, glass, ceramic, boron, silicon carbide, polyimide, polyamide, polyethylene, or a combination thereof. In an embodiment, the reinforcing fibers comprise a unidirectional array of individual continuous fibers, woven fabric, knitted fabric, yarn, roving, braided constructions, or non-woven mat.

Advantageously, the nanocomposite is suitable for use in a prepreg, which includes any reinforcing or molding material that can be impregnated with the nanocomposite. In an embodiment, a prepreg includes the nanocomposite of any of the aspects or embodiments disclosed above. The curable nanocomposites of the invention can be used to make composite articles by a variety of conventional processes, e.g., resin transfer molding, filament winding, tow placement, resin infusion processes, compression sheet molding, or traditional prepreg processes. Prepregs can be prepared by impregnating an array of fibers (or a fabric) with the nanocomposite and then layering the impregnated tape or fabric. The resulting prepreg can then be cured by application of heat, along with the application of pressure or vacuum (or both) to remove any trapped air.

The nanocomposites can also be used to make composite parts by a resin transfer molding process, which is widely used to prepare composite parts for the aerospace and automotive industries. In this process, fibers are first shaped into a preform which is then compressed to final part shape in a metal mold. The nanocomposite can then be infused or transferred into the mold and heat-cured.

Composites can also be prepared from the nanocomposites by a filament winding process, which is typically used to prepare cylinders or other composites having a circular or oval cross-sectional shape. In this process, a fiber tow or an array of tows is impregnated with the nanocomposite by running it through a resin bath (preferably, containing a low viscosity resin) and immediately winding the impregnated tow onto a mandrel. The resulting composite can then be heat-cured.

A pultrusion process (a continuous process used to prepare constant cross-section parts) can also be used to make composites from the curable resin sols. In such a process, a large array of continuous fibers is first wetted out in a resin bath (preferably, containing a low viscosity resin). The resulting wet array is then pulled through a heated die, where trapped air is squeezed out and the resin is cured.

In a further exemplary embodiment, a method is provided of preparing a nanoparticle-containing curable resin system. The method comprises mixing from 10 to 70 weight percent of aggregated spherical pyrogenic silica nanoparticles with a curable resin and optionally a catalyst, a surface treatment agent, and/or a diluent, to form a mixture, wherein the mixture includes less than 2% by weight solvent and less than 0.5% by weight dispersant based on the nanoparticle weight; and milling the mixture in an immersion mill including milling media to form a milled resin system comprising spherical pyrogenic silica nanoparticles dispersed in the curable resin. Accordingly, the dispersed spherical pyrogenic silica nanoparticles are non-aggregated and non-agglomerated.

Advantageously, methods according to the present application eliminate the need to employ a solvent, a silica nanoparticle sol, or a dispersant, to effectively disperse the spherical pyrogenic silica nanoparticles in a curable resin. The spherical pyrogenic silica nanoparticles, moreover, need not be functionalized with a surface treatment agent prior to mixing with a curable resin. Hence, it is a benefit of embodiments of the method that high loadings (e.g., greater than 10 weight percent) of aggregated spherical pyrogenic silica nanoparticles are dispersed in a curable resin, while optionally including in the nanocomposite one or more of a catalyst, a diluent, a surface treatment agent, or a curing agent. Such optional components, however, are able to be mixed into the nanocomposite simultaneously with the aggregated spherical pyrogenic silica nanoparticles and curable resin.

Methods of the present disclosure are typically performed using an immersion mill apparatus, which combines milling and mixing to disperse a solid component into a liquid component, particularly for high viscosity systems. One suitable immersion mill apparatus is described in U.S. Pat. No. 7,175,118 (Hockmeyer). Such immersion mill apparatuses typically include a mixing tank for holding the mixture to be milled, each of 1) a high shear impeller assembly, 2) a low shear mixer blade assembly, and 3) an immersion mill, for immersion in the mixing tank, and controllers for simultaneously operating the assemblies. In operation, the mixture is directed by the low shear mixer blade assembly to the high shear impeller assembly to initiate dispersion of the solid components into the liquid components, and then to the immersion mill for milling to decrease the aggregate sizes of any aggregated solid components (e.g., aggregated spherical pyrogenic silica nanoparticles) and to further disperse the solid component in the liquid component. In certain embodiments, the milling media in the immersion mill comprises zirconia particles, preferably yttrium-stabilized zirconia beads.

The aggregated spherical pyrogenic silica nanoparticles typically comprise a particle size of about 10 micrometers (μm), or between about 2 μm and about 20 μm, or between about 0.2 μm and about 500 μm, or between about 0.2 μm and about 100 μm, or between about 1 μm and about 20 μm. The aggregated pyrogenic silica may be unimodal or bimodal, and may possess a narrow or wide particle size distribution.

In embodiments of the method, the milling of the aggregated spherical pyrogenic silica nanoparticles and curable resin is performed until the aggregated spherical pyrogenic silica nanoparticles are dispersed to form spherical silica nanoparticles comprising an average particle size (e.g., diameter) in the range from about 1 nanometer to about 1000 nanometers, or from about 1 nanometer to about 500 nanometers, or from about 1 nanometer to about 100 nanometers, or from about 1 nanometer to about 50 nanometers, or from about 100 nanometers to about 400 nanometers, or from about 500 nanometers to about 1000 nanometers. The spherical pyrogenic silica nanoparticles typically comprise a broad unimodal particle size distribution, such as diameters between about 1 nanometer and about 500 nanometers.

In certain embodiments of the method, the nanoparticle-containing curable resin system comprises from about 10 to about 30 weight percent, or from about 10 to about 50 weight percent, or from about 10 to about 70 weight percent, or from about 15 to about 50 weight percent, or from about 20 to about 50 weight percent, or from about 20 to about 35 weight percent, or from about 25 to about 50 weight percent, or from about 30 to about 50 weight percent, or from about 15 to about 70 weight percent, or from about 25 to about 70 weight percent, or from about 35 to about 70 weight percent, or from about 50 to about 70 weight percent of the spherical pyrogenic silica nanoparticles. In an embodiment, the milled resin system consists essentially of about 10 to about 70 weight percent of spherical pyrogenic silica nanoparticles dispersed in a curable resin.

In certain embodiments, the method comprises including at least one additional component (i.e., processing aid) with the aggregated spherical pyrogenic silica nanoparticles and curable resin. Such components include for example and without limitation, diluents, catalysts, surface treatment agents, curing agents, cure accelerators, defoamers, air release agents, crosslinking agents, dyes, flame retardants, pigments, impact modifiers, and flow control agents. In certain embodiments, the method further comprises including a catalyst with the aggregated spherical pyrogenic silica nanoparticles and curable resin for reacting silanol groups on the surface of the spherical pyrogenic silica nanoparticles with the curable resin system. In certain embodiments, the method further comprises including a diluent with the aggregated spherical pyrogenic silica nanoparticles and curable resin. In certain embodiments, the method further comprises including a surface treatment agent with the aggregated spherical pyrogenic silica nanoparticles and curable resin. It is an advantage of such embodiments that a catalyst, a diluent, and/or a surface treatment agent are included in a nanocomposite comprising a curable resin and aggregated spherical pyrogenic silica nanoparticles, rather than requiring mixture or reaction with the aggregated spherical pyrogenic silica nanoparticles prior to mixing with the curable resin. Suitable catalyst(s), diluent(s) and surface treatment agent(s) are as described in detail above.

In some embodiments, the method further comprises including fillers (e.g., reinforcing fibers, hollow glass spheres, etc.) in the milled resin system. Fillers suitable for including in the milled resin system are as described in detail above.

Exemplary Embodiments

1. A nanocomposite including spherical pyrogenic silica nanoparticles dispersed in a curable resin; wherein the nanocomposite contains less than 2% by weight solvent, and wherein the nanocomposite contains less than 0.5% by weight dispersant based on the nanoparticle weight.

2. The nanocomposite of embodiment 1 further including a catalyst for reacting silanol groups on the surface of the silica nanoparticles with the curable resin system.

3. The nanocomposite of embodiment 2 wherein the catalyst includes stannous chloride ($SnCl_2$) or methylethylketone peroxide.

4. The nanocomposite of any one of embodiments 1 through 3 further including a surface treatment agent including an organosilane, a monohydric alcohol, a polyol, or a combination thereof.

5. The nanocomposite of embodiment 4 wherein the surface treatment agent comprises phenyl trimethoxysilane, benzooxasilepin dimethyl ester, phenethyltrimethoxy silane, N-phenylaminopropyl trimethoxysilane, or a mixture thereof.

6. The nanocomposite of any one of embodiments 1 through 5 further including at least one diluent.

7. The nanocomposite of embodiment 6 wherein the at least one diluent includes a mono- or poly-functional glycidyl ether, styrene, or a combination thereof.

8. The nanocomposite of any one of embodiments 1 through 7 further including at least one processing aid selected from the group consisting of curing agents, cure accelerators, defoamers, air release agents, crosslinking agents, dyes, flame retardants, pigments, impact modifiers, and flow control agents.

9. The nanocomposite of any one of embodiments 1 through 8 wherein the nanocomposite includes less than 0.1% by weight dispersant.

10. The nanocomposite of any one of embodiments 1 through 9 wherein the curable resin includes an epoxy resin, a curable imide resin, a vinyl ester resin, an acrylic resin, a bisbenzocyclobutane resin, a polycyanate ester resin, or a mixture thereof.

11. The nanocomposite of any one of embodiments 1 through 10 wherein the curable resin includes an epoxy resin, a maleimide resin, a polycyanate ester resins, or a mixture thereof.

12. The nanocomposite of any one of embodiments 1 through 11 wherein the curable resin includes a digycidyl ether of bisphenol A, a diglycidyl ether of bisphenol F, ethylidene bis-4,1-phenylene dicyanate, N,N'-4,4'-diphenylmethanebismaleimide, 4,4'-(1-methylethylidene)bis(2-(2-propenyl)phenol), or a mixture thereof.

13. The nanocomposite of any one of embodiments 1 through 12 wherein the curable resin includes an epoxy resin or a mixture of epoxy resins.

14. The nanocomposite of any one of embodiments 1 through 13 wherein the silica nanoparticles include an average particle size in the range from about 1 nanometer to about 1000 nanometers.

15. The nanocomposite of any one of embodiments 1 through 14 wherein the silica nanoparticles include a unimodal particle size distribution including diameters in the range from about 1 nanometer to about 500 nanometers.

16. The nanocomposite of any one of embodiments 1 through 14 wherein the silica nanoparticles include an average particle size in the range from about 1 nanometer to about 100 nanometers.

17. The nanocomposite of any one of embodiments 1 through 16 wherein the nanocomposite includes from about 10 to about 70 weight percent of the silica nanoparticles.

18. The nanocomposite of any one of embodiments 1 through 17 wherein the nanocomposite includes from about 15 to about 30 weight percent of the silica nanoparticles.

19. The nanocomposite of any one of embodiments 1 through 17 wherein the nanocomposite includes from about 20 to about 70 weight percent of the silica nanoparticles.

20. The nanocomposite of any one of embodiments 1 through 17 wherein the nanocomposite includes about 50 weight percent of the silica nanoparticles.

21. The nanocomposite of any one of embodiments 1 through 20 wherein the nanocomposite has a viscosity of 1 to 100 Pascals·second (Pa·s), inclusive, as determined according to ASTM D 2196 and at a constant shear rate of 1 $s^{-1}$.

22. The nanocomposite of any one of embodiments 1 through 21 wherein the nanocomposite has a viscosity of 1 to 90 Pa·s, inclusive, as measured according to ASTM D2196 at 30 degrees Celsius and at a constant shear rate of 1 $s^{-1}$.

23. The nanocomposite of any one of embodiments 1 through 22 wherein the nanocomposite has a viscosity of 1 to 80 Pa·s as measured according to ASTM D2196 at 30 degrees Celsius and at a constant shear rate of 1 $s^{-1}$.

24. The nanocomposite of any one of embodiments 1 through 23 wherein the nanocomposite has a viscosity of 1 to 70 Pa·s as measured according to ASTM D2196 at 30 degrees Celsius and at a constant shear rate of 1 $s^{-1}$.

25. The nanocomposite of any one of embodiments 1 through 24 wherein the nanocomposite has a viscosity of 1 to 60 Pa·s as measured according to ASTM D2196 at 30 degrees Celsius and at a constant shear rate of 1 $s^{-1}$.

26. The nanocomposite of embodiment 1 wherein the nanocomposite consists essentially of about 15 to about 30 weight percent of the silica nanoparticles dispersed in the curable resin, and the nanocomposite comprises a viscosity of 1 to 70 Pa·s as measured according to ASTM D2196 at 30 degrees Celsius and at a constant shear rate of 1 $s^{-1}$.

27. The nanocomposite of embodiment 1 wherein the nanocomposite consists essentially of about 20 to about 70 weight percent of the silica nanoparticles dispersed in the curable resin, and the nanocomposite comprises a viscosity of 1 to 100 Pa·s as measured according to ASTM D2196 at 30 degrees Celsius and at a constant shear rate of 1 $s^{-1}$.

28. The nanocomposite of any one of embodiments 1 through 25 further including a filler including at least one of reinforcing continuous fibers, reinforcing discontinuous fibers, and hollow glass bubbles.

29. The nanocomposite of embodiment 28 wherein the filler includes at least one of reinforcing continuous fibers and reinforcing discontinuous fibers.

30. The nanocomposite of embodiment 28 or embodiment 29 wherein the filler includes carbon, glass, ceramic, boron, silicon carbide, basalt, ceramic, polyimide, polyamide, polyethylene, or a combination thereof.

31. The nanocomposite of any one of embodiments 28 through 30 wherein said reinforcing fibers include a unidirectional array of individual continuous fibers, woven fabric, knitted fabric, yarn, roving, braided constructions, or nonwoven mat.

32. The nanocomposite of any one of embodiments 1 through 31 wherein the nanocomposite includes less than 0.5% by weight solvent.

33. The nanocomposite of any one of embodiments 1 through 25 or 28 through 32 further including a curing agent including an amine curing agent, an anhydride curing agent, a dicyandiamide curing agent, a diaminodiphenyl sulfone curing agent, or a combination thereof.

34. The nanocomposite of embodiment 33 wherein the curing agent includes an amine curing agent.

35. The nanocomposite of embodiment 33 wherein the curing agent includes an anhydride curing agent.

36. The nanocomposite of embodiment 33 wherein the curing agent includes a dicyandiamide curing agent.

37. The nanocomposite of embodiment 1 wherein the nanocomposite consists essentially of the silica nanoparticles dispersed in the curable resin.

38. A prepreg including the nanocomposite of any one of embodiments 1 through 37.

39. A composite including the cured nanocomposite of any one of embodiments 1 through 27 or 32 through 36 as a matrix resin and at least one filler embedded in the matrix resin.

40. An article including the composite of embodiment 39.

41. A composite including from about 4 to 70 weight percent of spherical pyrogenic silica nanoparticles dispersed in a cured resin; and a filler embedded in the cured resin, wherein the composite contains less than 0.5% by weight dispersant based on the nanoparticle weight. The filler includes at least one of a reinforcing continuous fiber, reinforcing discontinuous fibers, and hollow glass bubbles.

42. The composite of embodiment 41 further including a catalyst.

43. The composite of embodiment 42 wherein the catalyst includes stannous chloride ($SnCl_2$) or methylethylketone peroxide.

44. The composite of any one of embodiments 41 through 43 further including a surface treatment agent including an organosilane, a monohydric alcohol, a polyol, or a combination thereof.

45. The composite of embodiment 44 wherein the surface treatment agent comprises phenyl trimethoxysilane, benzoxasilepin dimethyl ester, phenethyltrimethoxy silane, N-phenylaminopropyl trimethoxysilane, or a mixture thereof.

46. The composite of any one of embodiments 41 through 45 further including at least one diluent.

47. The composite of embodiment 46 wherein the at least one diluent includes a mono- or poly-functional glycidyl ether, styrene, or a combination thereof.

48. The composite of any one of embodiments 41 through 47 further including at least one processing aid selected from the group consisting of curing agents, cure accelerators, defoamers, air release agents, crosslinking agents, dyes, flame retardants, pigments, impact modifiers, and flow control agents.

49. The composite of any one of embodiments 41 through 48 wherein the composite includes less than 0.1% by weight dispersant based on the nanoparticle weight.

50. The composite of any one of embodiments 41 through 49 wherein the cured resin includes an epoxy resin, a cured imide resin, a vinyl ester resin, an acrylic resin, a bisbenzocyclobutane resin, a polycyanate ester resin, or a mixture thereof.

51. The composite of any one of embodiments 41 through 50 wherein the cured resin includes an epoxy resin, a maleimide resin, a polycyanate ester resins, or a mixture thereof.

52. The composite of any one of embodiments 41 through 51 wherein the cured resin includes a digycidyl ether of bisphenol A, a diglycidyl ether of bisphenol F, ethylidene bis-4,1-phenylene dicyanate, N,N'-4,4'-diphenylmethanebismaleimide, 4,4'-(1-methylethylidene)bis(2-(2-propenyl) phenol), or a mixture thereof.

53. The composite of any one of embodiments 41 through 52 wherein the cured resin includes an epoxy resin or a mixture of epoxy resins.

54. The composite of any one of embodiments 41 through 53 wherein the silica nanoparticles include an average particle size in the range from about 1 nanometer to about 1000 nanometers.

55. The composite of any one of embodiments 41 through 54 wherein the silica nanoparticles include a unimodal particle size distribution including diameters in the range from about 1 nanometer to about 500 nanometers.

56. The composite of any one of embodiments 41 through 55 wherein the silica nanoparticles include an average particle size in the range from about 1 nanometer to about 100 nanometers.

57. The composite of any one of embodiments 41 through 56 wherein the composite includes from about 10 to about 50 weight percent of the silica nanoparticles.

58. The composite of any one of embodiments 41 through 57 wherein the composite includes from about 15 to about 30 weight percent of the silica nanoparticles.

59. The composite of any one of embodiments 41 through 56 wherein the composite includes from about 20 to about 70 weight percent of the silica nanoparticles.

60. The composite of any one of embodiments 41 through 59 wherein the filler includes at least one of reinforcing continuous fibers and reinforcing discontinuous fibers.

61. The composite of embodiment 60 wherein the filler includes carbon, glass, ceramic, boron, silicon carbide, basalt, ceramic, polyimide, polyamide, polyethylene, polypropylene, polyacrylnitrile, or a combination thereof.

62. The composite of embodiment 60 or embodiment 61 wherein the reinforcing continuous fibers include a unidirectional array of individual continuous fibers, woven fabric, knitted fabric, yarn, roving, braided constructions, or nonwoven mat.

63. The composite of any one of embodiments 41 through 62 further including a curing agent including an amine curing agent, an anhydride curing agent, a dicyandiamide curing agent, a diaminodiphenyl sulfone curing agent, or a combination thereof.

64. The composite of embodiment 63 wherein the curing agent includes an amine curing agent.

65. The composite of embodiment 63 wherein the curing agent includes an anhydride curing agent.

66. The composite of embodiment 63 wherein the curing agent includes a dicyandiamide curing agent.

67. The composite of embodiment 63 wherein the curing agent includes a diaminodiphenyl sulfone curing agent.

68. The composite of embodiment 41 wherein the composite consists essentially of the spherical pyrogenic silica nanoparticles dispersed in the cured resin and the filler embedded in the cured resin.

69. An article including from about 10 to about 50 weight percent of spherical pyrogenic silica nanoparticles dispersed in a cured resin, wherein the article contains less than 0.5% by weight dispersant based on the nanoparticle weight.

70. The article of embodiment 69 further including a catalyst.

71. The article of embodiment 70 wherein the catalyst includes stannous chloride ($SnCl_2$) or methylethylketone peroxide.

72. The article of any one of embodiments 69 through 71 further including a surface treatment agent including an organosilane, a monohydric alcohol, a polyol, or a combination thereof.

73. The article of embodiment 72 wherein the surface treatment agent comprises phenyl trimethoxysilane, benzooxasilepin dimethyl ester, phenethyltrimethoxy silane, N-phenylaminopropyl trimethoxysilane, or a mixture thereof.

74. The article of any one of embodiments 69 through 73 further including at least one diluent.

75. The article of embodiment 74 wherein the at least one diluent includes a mono- or poly-functional glycidyl ether, styrene, or a combination thereof.

76. The article of any one of embodiments 69 through 75 further including at least one processing aid selected from the group consisting of curing agents, cure accelerators, defoamers, air release agents, crosslinking agents, dyes, flame retardants, pigments, impact modifiers, and flow control agents.

77. The article of any one of embodiments 69 through 76 wherein the cured resin includes an epoxy resin, a cured imide resin, a vinyl ester resin, an acrylic resin, a bisbenzocyclobutane resin, a polycyanate ester resin, or a mixture thereof.

78. The article of any one of embodiments 69 through 77 wherein the cured resin includes an epoxy resin, a maleimide resin, a polycyanate ester resins, or a mixture thereof.

79. The article of any one of embodiments 69 through 78 wherein the cured resin includes a digycidyl ether of bisphenol A, a diglycidyl ether of bisphenol F, ethylidene bis-4,1-phenylene dicyanate, N,N'-4,4'-diphenylmethanebismaleimide, 4,4'-(1-methylethylidene)bis(2-(2-propenyl)phenol), or a mixture thereof.

80. The article of any one of embodiments 69 through 79 wherein the cured resin includes an epoxy resin or a mixture of epoxy resins.

81. The article of any one of embodiments 69 through 80 wherein the silica nanoparticles include an average particle size in the range from about 1 nanometer to about 1000 nanometers.

82. The article of any one of embodiments 69 through 81 wherein the silica nanoparticles include a unimodal particle size distribution including diameters in the range from about 1 nanometer to about 500 nanometers.

83. The article of any one of embodiments 69 through 82 wherein the silica nanoparticles include an average particle size in the range from about 1 nanometer to about 100 nanometers.

84. The article of any one of embodiments 69 through 83 wherein the article includes from about 10 to about 30 weight percent of the silica nanoparticles.

85. The article of any one of embodiments 69 through 84 wherein the article includes from about 15 to about 30 weight percent of the silica nanoparticles.

86. The article of any one of embodiments 69 through 83 wherein the article includes from about 20 to about 70 weight percent of the silica nanoparticles.

87. The article of any one of embodiments 69 through 86 further including a filler embedded in the cured resin, wherein the filler includes at least one of reinforcing continuous fibers, reinforcing discontinuous fibers, and hollow glass bubbles.

88. The article of embodiment 87 wherein the filler includes at least one of reinforcing continuous fibers and reinforcing discontinuous fibers.

89. The article of embodiment 87 or embodiment 88 wherein the filler includes carbon, glass, ceramic, boron, silicon carbide, basalt, ceramic polyimide, polyamide, polyethylene, polypropylene, polyacrylnitrile, or a combination thereof.

90. The article of any one of embodiments 87 through 89 wherein the reinforcing continuous fibers include a unidirectional array of individual continuous fibers, woven fabric, knitted fabric, yarn, roving, braided constructions, or nonwoven mat.

91. The article of any one of embodiments 69 through 90 further including a curing agent including an amine curing agent, an anhydride curing agent, a dicyandiamide curing agent, a diaminodiphenyl sulfone, or a combination thereof.

92. The article of embodiment 91 wherein the curing agent includes an amine curing agent.

93. The article of embodiment 91 wherein the curing agent includes an anhydride curing agent.

94. The article of embodiment 91 wherein the curing agent includes a dicyandiamide curing agent.

95. The article of embodiment 91 wherein the curing agent includes a diaminodiphenyl sulfone curing agent.

96. The article of any one of embodiments 69 through 95 wherein the article includes a turbine blade, a pressure vessel, an aerospace part, a cable, or sporting goods equipment.

97. The article of embodiment 96 wherein the article includes a golf club, a baseball bat, a fishing rod, a racquet, or a bicycle frame.

98. The article of any one of embodiments 69 through 97 wherein the article includes less than 0.1% by weight dispersant based on the nanoparticle weight.

99. The article of embodiment 69 consisting essentially of about 10 to about 50 weight percent of spherical pyrogenic silica nanoparticles dispersed in a cured resin.

100. A method of preparing a nanoparticle-containing curable resin system including mixing from 10 to 70 weight percent of aggregated spherical pyrogenic silica nanoparticles with a curable resin, and optionally a catalyst, a surface treatment agent, and/or a diluent, to form a mixture, wherein the mixture includes less than 2% by weight solvent, wherein the mixture includes less than 0.5% by weight dispersant based on the nanoparticle weight; and milling the mixture in an immersion mill including milling media to form a milled resin system comprising spherical pyrogenic silica nanoparticles dispersed in the curable resin.

101. The method of embodiment 100 wherein the aggregated spherical pyrogenic silica nanoparticles include an average size in the range from about 25 micrometers (μm) to about 300 μm.

102. The method of embodiment 100 or embodiment 101 wherein the milling media includes zirconia particles.

103. The method of any one of embodiments 100 through 102 wherein the milling media includes yttrium-stabilized zirconia beads.

104. The method of any one of embodiments 100 through 103 wherein the milling is performed until the aggregated silica nanoparticles are dispersed to form silica nanoparticles including an average particle size in the range from about 1 nanometer to about 1000 nanometers.

105. The method of any one of embodiments 100 through 104 wherein the silica nanoparticles include a unimodal particle size distribution including diameters in the range from about 1 nanometer to about 500 nanometers.

106. The method of any one of embodiments 100 through 105 wherein the silica nanoparticles include an average particle size in the range from about 1 nanometer to about 100 nanometers.

107. The method of any one of embodiments 100 through 106 further comprising including a catalyst in the mixture for reacting silanol groups on the surface of the silica nanoparticles with the curable resin system.

108. The method of embodiment 107 wherein the catalyst includes stannous chloride ($SnCl_2$) or methylethylketone peroxide.

109. The method of any one of embodiments 100 through 108 further including a surface treatment agent including an organosilane, a monohydric alcohol, a polyol, or a combination thereof.

110. The method of embodiment 109 wherein the surface treatment agent includes surfaces treated with phenyl trimethoxysilane, benzooxasilepin dimethyl ester, phenethyltrimethoxy silane, N-phenylaminopropyl trimethoxysilane, or a mixture thereof.

111. The method of any one of embodiments 100 through 110 further comprising including at least one diluent in the mixture.

112. The method of embodiment 111 wherein the at least one diluent includes a mono- or poly-functional glycidyl ether, styrene, or a combination thereof.

113. The method of any one of embodiments 100 through 112 further including at least one processing aid selected from the group consisting of curing agents, cure accelerators, defoamers, air release agents, catalysts, crosslinking agents, dyes, flame retardants, pigments, impact modifiers, and flow control agents.

114. The method of any one of embodiments 100 through 113 wherein the curable resin includes an epoxy resin, a curable imide resin, a vinyl ester resin, an acrylic resin, a bisbenzocyclobutane resin, a polycyanate ester resin, or a mixture thereof.

115. The method of any one of embodiments 100 through 114 wherein the curable resin includes an epoxy resin, a maleimide resin, a polycyanate ester resins, or a mixture thereof.

116. The method of any one of embodiments 100 through 115 wherein the curable resin includes a digycidyl ether of bisphenol A, a diglycidyl ether of bisphenol F, ethylidene bis-4,1-phenylene dicyanate, N,N'-4,4'-diphenylmethanebismaleimide, 4,4'-(1-methylethylidene)bis(2-(2-propenyl)phenol), or a mixture thereof.

117. The method of any one of embodiments 100 through 116 wherein the curable resin includes an epoxy resin or a mixture of epoxy resins.

118. The method of any one of embodiments 100 through 117 wherein the milled resin system includes from about 15 to about 30 weight percent of the silica nanoparticles.

119. The method of any one of embodiments 100 through 118 wherein the milled resin system includes from about 20 to about 50 weight percent of the silica nanoparticles.

120. The method of any one of embodiments 100 through 117 wherein the milled resin system includes from about 20 to about 70 weight percent of the silica nanoparticles.

121. The method of any one of embodiments 100 through 120 further comprising including a filler in the milled resin system including at least one of reinforcing continuous fibers, reinforcing discontinuous fibers, and hollow glass bubbles.

122. The method of embodiment 121 wherein the filler includes at least one of reinforcing continuous fibers and reinforcing discontinuous fibers.

123. The method of embodiment 121 or embodiment 122 wherein the filler includes carbon, glass, ceramic, boron, silicon carbide, basalt, ceramic, polyimide, polyamide, polyethylene, polypropylene, polyacrylnitrile, or a combination thereof.

124. The method of embodiment 122 or embodiment 123 wherein the reinforcing continuous fibers include a unidirectional array of individual continuous fibers, woven fabric, knitted fabric, yarn, roving, braided constructions, or non-woven mat.

125. The method of any one of embodiments 100 through 124 further comprising including a curing agent in the milled resin system, the curing agent including an amine curing agent, an anhydride curing agent, a dicyandiamide curing agent, a diaminodiphenyl sulfone curing agent, or a combination thereof.

126. The method of embodiment 125 wherein the curing agent includes an amine curing agent.

127. The method of embodiment 125 wherein the curing agent includes an anhydride curing agent.

128. The method of embodiment 125 wherein the curing agent includes a dicyandiamide curing agent.

129. The method of embodiment 125 wherein the curing agent includes a diaminodiphenyl sulfone curing agent.

130. The method of any one of embodiments 100 through 129 wherein the milled resin system includes less than 0.1% by weight dispersant based on the nanoparticle weight.

131. The method of embodiment 100 wherein the milled resin system consists essentially of about 10 to about 70 weight percent of spherical pyrogenic silica nanoparticles dispersed in a curable resin.

132. The method of any one of embodiments 100 through 131 wherein the milled resin system has a viscosity of 1 to 100 Pascals·second (Pa·s), inclusive, as determined according to ASTM D 2196 and at a constant shear rate of $1\ s^{-1}$.

133. The method of any one of embodiments 100 through 132 wherein the milled resin system has a viscosity of 1 to 90 Pa·s, inclusive, as measured according to ASTM D2196 at 30 degrees Celsius and at a constant shear rate of $1\ s^{-1}$.

134. The method of any one of embodiments 100 through 133 wherein the milled resin system has a viscosity of 1 to 80 Pa·s as measured according to ASTM D2196 at 30 degrees Celsius and at a constant shear rate of $1\ s^{-1}$.

135. The method of any one of embodiments 100 through 134 wherein the milled resin system has a viscosity of 1 to 70 Pa·s as measured according to ASTM D2196 at 30 degrees Celsius and at a constant shear rate of $1\ s^{-1}$.

136. The method of any one of embodiments 100 through 135 wherein the milled resin system has a viscosity of 1 to 60 Pa·s as measured according to ASTM D2196 at 30 degrees Celsius and at a constant shear rate of $1\ s^{-1}$.

137. The method of any one of embodiments 100 through 119 or 121 through 136 wherein the milled resin system consists essentially of about 15 to about 30 weight percent of the silica nanoparticles dispersed in the curable resin, and the nanocomposite comprises a viscosity of 1 to 70 Pa·s as measured according to ASTM D2196 at 30 degrees Celsius and at a constant shear rate of $1\ s^{-1}$.

138. The method of any one of embodiments 100 through 117 or 121 through 136 wherein the milled resin system consists essentially of about 20 to about 70 weight percent of the silica nanoparticles dispersed in the curable resin, and the nanocomposite comprises a viscosity of 1 to 100 Pa·s as measured according to ASTM D2196 at 30 degrees Celsius and at a constant shear rate of 1 s$^{-1}$.

139. A nanocomposite comprising spherical pyrogenic silica nanoparticles dispersed in a curing agent; wherein the nanocomposite contains less than 2% by weight solvent, and wherein the nanocomposite contains less than 0.5% by weight dispersant based on the nanoparticle weight.

140. The nanocomposite of embodiment 139 wherein the curing agent includes an amine curing agent, an anhydride curing agent, a dicyandiamide curing agent, a diaminodiphenyl sulfone curing agent, or a combination thereof.

141. The nanocomposite of embodiment 139 or embodiment 140 wherein the curing agent includes an amine curing agent.

142. The nanocomposite of embodiment 139 or embodiment 140 wherein the curing agent includes an anhydride curing agent.

143. The nanocomposite of embodiment 139 or embodiment 140 wherein the curing agent includes a dicyandiamide curing agent.

144. The nanocomposite of any one of embodiments 139 through 143 further including a surface treatment agent including an organosilane, a monohydric alcohol, a polyol, or a combination thereof.

145. The nanocomposite of embodiment 144 wherein the surface treatment agent comprises phenyl trimethoxysilane, benzooxasilepin dimethyl ester, phenethyltrimethoxy silane, N-phenylaminopropyl trimethoxysilane, or a mixture thereof.

146. The nanocomposite of any one of embodiments 139 through 145 further including at least one diluent.

147. The nanocomposite of embodiment 146 wherein the at least one diluent includes a mono- or poly-functional glycidyl ether, styrene, or a combination thereof.

148. The nanocomposite of any one of embodiments 139 through 147 further including at least one processing aid selected from the group consisting of cure accelerators, defoamers, air release agents, crosslinking agents, dyes, flame retardants, pigments, impact modifiers, and flow control agents.

149. The nanocomposite of any one of embodiments 139 through 148 wherein the nanocomposite includes less than 0.1% by weight dispersant.

150. The nanocomposite of any one of embodiments 139 through 149 wherein the silica nanoparticles include an average particle size in the range from about 1 nanometer to about 1000 nanometers.

151. The nanocomposite of any one of embodiments 139 through 150 wherein the silica nanoparticles include a unimodal particle size distribution including diameters in the range from about 1 nanometer to about 500 nanometers.

152. The nanocomposite of any one of embodiments 139 through 151 wherein the silica nanoparticles include an average particle size in the range from about 1 nanometer to about 100 nanometers.

153. The nanocomposite of any one of embodiments 139 through 152 wherein the nanocomposite includes from about 10 to about 70 weight percent of the silica nanoparticles.

154. The nanocomposite of any one of embodiments 139 through 153 wherein the nanocomposite includes from about 15 to about 30 weight percent of the silica nanoparticles.

155. The nanocomposite of any one of embodiments 139 through 153 wherein the nanocomposite includes from about 20 to about 70 weight percent of the silica nanoparticles.

156. The nanocomposite of any one of embodiments 139 through 153 wherein the nanocomposite includes about 50 weight percent of the silica nanoparticles.

157. The nanocomposite of any one of embodiments 139 through 156 wherein the nanocomposite has a viscosity of 1 to 100 Pascals·second (Pa·s), inclusive, as determined according to ASTM D 2196 and at a constant shear rate of 1 s$^{-1}$.

158. The nanocomposite of any one of embodiments 139 through 157 wherein the nanocomposite has a viscosity of 1 to 90 Pa·s, inclusive, as measured according to ASTM D2196 at 30 degrees Celsius and at a constant shear rate of 1 s$^{-1}$.

159. The nanocomposite of any one of embodiments 139 through 158 wherein the nanocomposite has a viscosity of 1 to 80 Pa·s as measured according to ASTM D2196 at 30 degrees Celsius and at a constant shear rate of 1 s$^{-1}$.

160. The nanocomposite of any one of embodiments 139 through 159 wherein the nanocomposite has a viscosity of 1 to 70 Pa·s as measured according to ASTM D2196 at 30 degrees Celsius and at a constant shear rate of 1 s$^{-1}$.

161. The nanocomposite of any one of embodiments 139 through 160 wherein the nanocomposite has a viscosity of 1 to 60 Pa·s as measured according to ASTM D2196 at 30 degrees Celsius and at a constant shear rate of 1 s$^{-1}$.

162. The nanocomposite of any one of embodiments 139 through 161 further including a filler including at least one of reinforcing continuous fibers, reinforcing discontinuous fibers, and hollow glass bubbles.

163. The nanocomposite of embodiment 162 wherein the filler includes at least one of reinforcing continuous fibers and reinforcing discontinuous fibers.

164. The nanocomposite of embodiment 162 or embodiment 163 wherein the filler includes carbon, glass, ceramic, boron, silicon carbide, basalt, ceramic, polyimide, polyamide, polyethylene, or a combination thereof.

165. The nanocomposite of any one of embodiments 162 through 164 wherein said reinforcing fibers include a unidirectional array of individual continuous fibers, woven fabric, knitted fabric, yarn, roving, braided constructions, or non-woven mat.

166. The nanocomposite of any one of embodiments 139 through 165 wherein the nanocomposite includes less than 0.5% by weight solvent.

167. The nanocomposite of embodiment 139 wherein the nanocomposite consists essentially of the silica nanoparticles dispersed in the curing agent.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

Unless otherwise noted, all parts, percentages, ratios, etc. in the Examples and the rest of the specification are by weight. Table 1 provides a description or role, and a source, for materials used in the Examples below:

TABLE 1

Materials

| Material | Description or Role | Source |
| --- | --- | --- |
| NALCO 2329 | silica nanoparticles | Nalco Chemical Company, Oak Brook, IL |
| NALCO 2327 | silica nanoparticles | Nalco Chemical Company |
| TIXOSIL 68 | silica nanoparticles | Rhodia, Bristol, PA |
| NANOSIL | silica nanoparticles | Energy Strategy Associates, Inc., Old Chatham, NY |
| EPON 828 | liquid epoxy resin | Momentive Performance Materials Inc., Albany, NY |
| EPON 826 | liquid epoxy resin | Momentive Performance Materials Inc. |
| HELOXY 107 | Reactive diluent | BYK USA, Inc., Wallingford, CT |
| BYK W9010 | dispersant | BYK USA, Inc. |
| LUBRIZOL D570 | dispersant | The Lubrizol Corporation, Wickliffe, OH |
| BYK 2152 | dispersant | BYK USA, Inc. |
| Phenyl trimethyoxysilane (TMPS) | silane surface agent | Momentive Performance Materials Inc. |
| BYK 1790 | defoamer | BYK USA, Inc. |
| EPIKURE 3230 | amine curing agent | Momentive Performance Materials Inc. |
| LINDRIDE 36V | anhydride curing agent | Lindau Chemicals, Inc., Columbia, SC |
| 1-methoxy-2-propanol | solvent | Univar USA Inc., Kirkland, WA |
| Methylethylketone | solvent | Avantor Performance Materials, Inc., Center Valley, PA |
| Deionized water | solvent | — |

Particle Size Test Method

Particle size of the silica particles was measured by laser diffraction using a Horiba LA-950 (Horiba, Kyoto, Japan). The optical model used a refractive index of 1.46 for silica and 1.38 for methylethylketone (MEK). The second differential method was used for smoothing based on 150 iterations. The dispersion was diluted to approximately 1 weight percent solids with MEK. The diluted sample was then added to the measurement cell which was filled with MEK until the transmittance was between the recommended levels of 85-95%. The mean is the average particle size in the sample volume and D90 is the maximum particle size below which 90% of the sample volume exists.

Thermogravimetric Test Method

Nanoparticle concentration of the uncured nanocomposites was measured according to ASTM E 1131, using either a Q50 or Q5000 Thermogravimetric Analyzer (TA Instruments, New Castle, Del.).

Viscosity Test Method

Viscosity was measured according to ASTM D 2196, using an AR2000 viscometer (TA Instruments, New Castle, Del.).

Glass Transition Temperature Test Method

Glass transition temperature ($T_g$) was measured according to ASTM D 7028, using a Q800 dynamic mechanical analyzer (DMA) (TA Instruments, New Castle, Del.).

Mechanical Properties Test Method

Mechanical properties (e.g. storage modulus, tensile modulus, strain at break) were measured according to ASTM D 638, using a Q800 dynamic mechanical analyzer (DMA) (TA Instruments, New Castle, Del.) and MTS Insight 30 Electromechanical Testing System (MTS Systems Corporation, Eden Prairie, Minn.).

Immersion Mill Method

Example nanocomposites were prepared using the following solvent-free milling method. A premix was prepared with the components of the silica nanocomposite. Epoxy (EPON 826) was preheated to 90° C. to decrease its viscosity for ease of handling. The preheated epoxy resin was transferred to a stainless steel jacketed kettle. To the kettle may be added a reactive diluent (HELOXY 107) and/or dispersant (W9010, D570, or 2152) as described in the examples. A 1:3 ethylene glycol:water mixture was circulated through the jacket of the kettle to control composition temperature during preparation of the premix as well as during milling. The temperature of the glycol:water mixture, and in turn, the composition was regulated by a circulator (PHOENIX II, Thermo Fisher Scientific, Newington, N.H.). The kettle containing the liquid components was secured to the frame of a disperser equipped with a 90 millimeter f-blade (DISPERMAT, CN-10, BYK-Gardner, Columbia, Md.). After activation of the f-blade, mixing of the liquid components, dry silica (TIXOSIL 68 or NANOSIL) was gradually added to the kettle.

Milling was performed using a Micro Mill immersion mill (Hockmeyer Equipment Corporation, Elizabeth City, N.C.). The immersion mill was operated with a 0.1 millimeter wire wedge screen filled with approximately 40 milliliters (65 grams) 0.5-0.7 mm yttrium-stabilized zirconia milling media (Zirmil, Saint-Gobain, Le Pontet Cedex, France). Enclosed in the media field were 8 pegs to agitate the media. A clipped marine prop at the bottom exterior of the screen provided the driving force for material to circulate through the media field. No auger was used when milling. A prewetting procedure was used whereby the milled hardware (screen, milling media, pegs, prop) was wetted and heated with pure epoxy (EPON 826) prior to milling. To accomplish this, the mill hardware was immersed in a stainless steel vessel containing epoxy and the mill activated. The process of milling the pure epoxy both wetted and heated the mill hardware that would be contact with the composition. After wetting and heating, the hardware was raised from the epoxy and the mill jogged to remove excess epoxy from the hardware. The kettle containing the premix was then transferred from the disperser station to the milling station and milling initiated. The mill was operated between 2,000 and 4,000 revolutions per minute (rpm).

Milling resulted in size reduction of the particles from tens to hundreds of micrometers to about a hundred nanometers, as well as compounding of the nanoparticles into the epoxy. Milling was continued until no further significant reduction in particle size was measured.

Comparative Example 1

Resin without Silica Nanoparticles

The resin of Comparative Example 1 is epoxy (EPON 826).

Comparative Example 2

Silica Nanocomposite with Surface Treatment by a Solvent-based Method

The silica nanocomposite of Comparative Example 2 was prepared using a mixture of surface treated colloidal silicas (NALCO 2329 and NALCO 2327). The surface treatment process of Comparative Example 2 was similar to the methods described in Examples 1 and 9-13 of International Patent Application Publication No. WO 2009/120846 (Tiefenbruck et al.). Phenyl trimethoxysilane (TMPS) was used as the surface treatment agent. Upon completion of the surface treatment process, epoxy (EPON 826) was compounded into the dispersion. The dispersion was then fed through a wiped film evaporator to remove the water and solvent from the dispersion, according to methods described in International Patent Application Publication No. WO 2011/159521 (Thunhorst et al.). The completion of the stripping process yielded a nanocomposite of silane covalently bonded to the silica in epoxy. The silica nanocomposite was diluted with epoxy (EPON 826) using a speedmixer (Model ARV-3 Vacuum Mixer, Thinky USA, Inc., Laguna Hills, Calif.) to achieve the final composition of Table 2.

Comparative Example 3

Silica Nanocomposite with Dispersant by a Solvent-free Method

The silica nanocomposite of Comparative Example 3 was prepared with a precipitated silica (TIXOSIL 68) using the Immersion Mill Method described above. The composition, milling conditions, final particle size, and viscosity of the silica nanocomposite are given in Table 2.

Comparative Example 4

Silica Nanocomposite with Dispersant by a Solvent-free Method

The silica nanocomposite of Comparative Example 4 was prepared as Comparative Example 3 except the particle was a pyrogenic silica (NANOSIL). The composition, milling conditions, final particle size, and viscosity of the silica nanocomposite are given in Table 2.

Comparative Example 5

Silica Nanocomposite without Dispersant by a Solvent-free Method

The silica nanocomposite of Comparative Example 5 was prepared as Comparative Example 3 except no dispersant was used. The composition, milling conditions, final particle size, and viscosity of the silica nanocomposite are given in Table 2.

Example 1

Silica Nanocomposite without Surface Treatment by a Solvent-free Method

The silica nanocomposite of Example 1 was prepared according to the method of Comparative Example 3 except no dispersant or surface treatment agent was used. The composition, milling conditions, final particle size, and viscosity of the silica nanocomposite are given in Table 2.

TABLE 2

| | Nanocomposites | | | | | |
|---|---|---|---|---|---|---|
| | Unfilled | Solvent-based | Solvent-free | | | |
| | | | Example | | | |
| | CE 1 | CE 2 | CE 3 | CE 4 | CE 5 | EX 1 |
| Particle | — | NALCO | TIXOSIL | NANOSIL | TIXOSIL | NANOSIL |
| Dispersant | — | — | W9010 | W9010 | — | — |
| Surface Agent | — | TMPS | — | — | — | — |
| Nanoparticle (wt %) | — | 20.0 | 20.0 | 20.0 | 20.0 | 20.0 |
| Epoxy (EPON 826) (wt %) | 100.0 | 79.3 | 78.0 | 78.0 | 80.0 | 80.0 |
| Dispersant or Surface Agent (wt %) | 0 | 0.7 | 2.0 | 2.0 | 0 | 0 |
| Mill Time (hr:min) | n/a | n/a | 5:00 | 2:00 | 5:30 | 2:00 |
| Mill Temperature (° C.) | n/a | n/a | 102 | 208 | 92 | 96 |
| Mean Particle Size (nm) | n/a | NM | 101 | 107 | 109 | 102 |
| D90 Particle Size (nm) | n/a | NM | 128 | 146 | 125 | 143 |
| Viscosity*(Pa-s) | 30 | 90 | 572 | 86 | 1,219 | 62 |

NM: not measured;
*Viscosity measured at 30° C. and 1 s$^{-1}$.

Comparative Example 1a

Cured Resin without Nanoparticles

Comparative Example 1a was prepared by mixing Comparative Example 1 with an amine curing agent (EPIKURE 3230) according to Table 3 using a speedmixer (Model ARV-3 Vacuum Mixer, Thinky USA, Inc., Laguna Hills, Calif.). The mixture was transferred to a mold and then placed in an oven. The example was cured for 2 hours at 80° C. followed by a post cure for 2 hours at 125° C.

Comparative Examples 2a-4a

Cured Nanocomposites with Dispersant

Comparative Examples 2a-4a were prepared as Comparative Example 1a except Comparative Examples 2-4 were used as the uncured resin.

Example 1a and Comparative Example 5a

Cured Nanocomposites without Dispersant

Example 1a and Comparative Example 5a were prepared as Comparative Example 1a except Example 1 and Comparative Example 5 were used as the uncured resin.

TABLE 3

| Composition and characterization of cured nanocomposites | | | | | | |
|---|---|---|---|---|---|---|
| | Unfilled | Solvent-based | Solvent-free | | | |
| | | Example | | | | |
| | CE 1a | CE 2a | CE 3a | CE 4a | CE 5a | EX 1a |
| Particle | — | NALCO | TIXOSIL | NANOSIL | TIXOSIL | NANOSIL |
| Dispersant | — | — | W9010 | W9010 | — | — |
| Surface Agent | — | TMPS | — | — | — | — |
| Epoxy Nanocomposite (wt %) | — | 79.4 (CE 2) | 79.1 (CE 3) | 79.1 (CE 4) | 79.6 (CE 5) | 78.1 (EX 1) |
| Epoxy (EPON 826) (wt %) | 75.2 | — | — | — | — | — |
| Curing agent (EPIKURE 3230) (wt %) | 24.8 | 20.6 | 20.9 | 20.9 | 20.4 | 21.9 |
| E'$_{glass}$ (Mpa) | 2,521 | 3,138 | 3,104 | 2,918 | 3,274 | 2,969 |
| T$_g$ (° C.) | 86.7 | 87.1 | 83.9 | 86.2 | 88.7 | 87.4 |
| E'$_{rubber}$ (Mpa) | 18.64 | 24.51 | 33.99 | 25.77 | 37.97 | 28.39 |

Table 2 shows the viscosity of uncured silica nanocomposites with and without a dispersant (W9010) prepared by a solvent-free method. The nanocomposite prepared with precipitated silica (TIXOSIL 68) exhibits an increase in viscosity when the nanocomposite is prepared without a dispersant while the nanocomposite prepared with the pyrogenic silica (NANOSIL) exhibits similar low viscosity with and without a dispersant. As shown in Table 3, the cured nanocomposites exhibit similar glass transition temperature ($T_g$) with and without a dispersant. Also, the $T_g$ is not significantly affected by the particle loading. The storage moduli in the glassy state (E'glass) and rubbery state (E'rubber) are significantly higher for the nanocomposite relative to the unfilled epoxy. The E'glass and E'rubber for the nanocomposites without a dispersant are higher than the corresponding nanocomposites with a dispersant.

Comparative Example 6

Silica Nanocomposite with Surface Treatment by a Solvent-based Method

The silica nanocomposite of Comparative Example 6 was prepared as Comparative Example 2 except a mixture of epoxy (EPON 826) and reactive diluent (HELXOY 107) were used, and there was no epoxy dilution step. In addition, a defoamer (BYK 1790) was included in the formulation. The composition, milling conditions, and final particle size of the silica nanocomposite are given in Table 4.

Comparative Examples 7-9

Silica Nanocomposite with Dispersant by a Solvent-free Method

The silica nanocomposites of Comparative Examples 7-9 were prepared with a pyrogenic silica (NANOSIL) using the Immersion Mill Method described above with exclusion of prewetting step. The composition, milling conditions, and final particle size of the silica nanocomposites are given in Table 4.

Example 2 and 3

Silica Nanocomposite without Surface Treatment by a Solvent-free Method

The silica nanocomposites of Examples 2 and 3 were prepared as Comparative Examples 7-9 except no dispersant or surface treatment agent was included in the formulation. The composition, milling conditions, and final particle size of the silica nanocomposites are given in Table 4.

TABLE 4

Composition and characterization of uncured nanocomposites

| | Example | | | | | |
|---|---|---|---|---|---|---|
| | CE 6 | CE 7 | CE 8 | CE 9 | EX 2 | EX 3 |
| Particle | NALCO | NANOSIL | NANOSIL | NANOSIL | NANOSIL | NANOSIL |
| Dispersant | — | W9010 | D570 | 2152 | — | — |
| Surface Agent | TMPS | — | — | — | — | — |
| Nanoparticle (wt %) | 49.77 | 55.20 | 49.70 | 54.92 | 50.29 | 55.00 |
| Epoxy (EPON 826) (wt %) | 39.39 | 43.45 | 39.11 | 43.72 | 39.77 | 45.00 |
| Diluent (HELOXY 107) (wt %) | 9.85 | 0.0 | 09.78 | 0.0 | 9.94 | 0 |
| Dispersant or Surface Agent (wt %) | 0.99 | 1.36 | 1.40 | 1.36 | 0 | 0 |
| Defoamer (BYK 1790) (wt %) | 0.25 | 0 | 0 | 0 | 0 | 0 |
| Mill Time (hr:min) | n/a | 3:00 | 3:00 | 3:00 | 3:00 | 4:00 |
| Mill Temperature (° C.) | n/a | 111 | 100 | 105 | 100 | 111 |
| Mean Particle Size* (nm) | 70 (8.5) | 143 (33) | 125 (49) | 139 (40) | 122 (31) | 139 (39) |
| D90 Particle Size (nm) | 82 | 182 | 194 | 191 | 164 | 189 |

*standard deviation in parentheses

Examples 2 and 3 show that even without a surface treatment agent or a dispersant that particle size reduction is achieved. Furthermore, even without a surface treatment agent or a dispersant, the viscosity of the formulation is processable even at high particle loading, 50+ wt %. Indeed, Example 3 shows processability in the absence of each of a surface treatment agent, a dispersant, and a reactive diluent.

Comparative Examples 10 and 11

Cured Resin without Nanoparticles

Comparative Examples 10 and 11 were prepared by mixing resin without nanoparticles with an anhydride curing agent (LINDRIDE 36V) and defoamer (BYK 1790) according to Table 5 using a speedmixer (MODEL ARV-3 Vacuum Mixer, Thinky USA, Inc. Laguna Hills, Calif.). The viscosity of the formulated mixture was immediately measured as a function of time at 30° C. and a constant shear rate of 10 $s^{-1}$.

Comparative Example 6a

Cured Silica Nanocomposites with a Surface Treatment by a Solvent-based Method

Comparative Example 6a was prepared in the same manner as Comparative Examples 10 and 11 except a silica nanocomposite with particle surface treatment and defoamer was used Comparative Example 7a-9a Cured Silica Nanocomposites with Dispersant by a Solvent-free Method Comparative Examples 7a-9a were prepared in the same manner as Comparative Examples 10 and 11 except a silica nanocomposite with a dispersant was used.

Examples 2a and 3a

Cured Silica Nanocomposites without Surface Treatment by a Solvent-free Method

Examples 2a and 3a were prepared in the same manner as Comparative Examples 10 and 11 except no dispersant or particle surface treatment was used.

TABLE 5

Thermal and mechanical characterization of cured nanocomposites

| | Example | | | | | | | |
|---|---|---|---|---|---|---|---|---|
| | CE 10 | CE 11 | CE 6a | CE 7a | CE 8a | CE 9a | EX 2a | EX 3a |
| Particle | | | NALCO | NANOSIL | NANOSIL | NANOSIL | NANOSIL | NANOSIL |
| Dispersant | — | — | — | W9010 | D570 | 2152 | — | — |
| Surface Agent | — | — | TMPS | — | — | — | — | — |
| Epoxy Nanocomposite (wt %) | 0 | 0 | 67.93 (CE 6) | 61.58 (CE 7) | 68.31 (CE 8) | 61.35 (CE 9) | 67.34 (EX 2) | 60.64 (EX 3) |
| Epoxy (EPON 828) (wt %) | 52.94 | 0 | 0 | 0 | 0 | 0 | 0 | 0 |

TABLE 5-continued

Thermal and mechanical characterization of cured nanocomposites

| | Example | | | | | | | |
|---|---|---|---|---|---|---|---|---|
| | CE 10 | CE 11 | CE 6a | CE 7a | CE 8a | CE 9a | EX 2a | EX 3a |
| Epoxy (EPON 826) (wt %) | 0 | 41.18 | 0 | 0 | 0.05 | 0 | 0.38 | 0 |
| Diluent (HELOXY 107) (wt %) | 0 | 10.29 | 0 | 6.71 | 0.01 | 6.75 | 0.09 | 6.85 |
| Defoamer (BYK 1790) (wt %) | 0.16 | 0.15 | 0 | 0.18 | 0.14 | 0.24 | 0.20 | 0.24 |
| Curing agent (LINDRIDE 36V) (wt %) | 46.90 | 48.38 | 32.07 | 31.53 | 31.49 | 31.66 | 31.99 | 32.26 |

FIG. 1 shows the viscosity as a function of time of the formulated resins of Table 5. Relative to the formulation with EPON 828 (CE 10), the viscosity of the 80/20 EPON 826/HELOXY 107 (CE 11) exhibits lower viscosity due to the presence of the reactive diluent. The viscosity of the formulated nanocomposites is higher than the unfilled resins due to the presence of the silica nanoparticles. The formulated silica nanocomposites with the spherical colloidal silica and spherical pyrogenic silica exhibit similar viscosity. Differences in formulated silica nanocomposite viscosity are exhibited with different surface treatments.

Comparative Examples 12 and 13

Cured Resin without Nanoparticles

Comparative Examples 12 and 13 were prepared by mixing resin without nanoparticles with an anhydride curing agent (LINDRIDE 36V) and a defoamer (BYK 1790) according to Table 6 using a speedmixer (Model ARV-3 Vacuum Mixer, Thinky USA, Inc., Laguna Hills, Calif.). The mixture was transferred to a mold and then placed in an oven. The examples were cured for 3 hours at 63° C., followed by 2 hours at 91° C., and followed by 2 hours at 85° C.

Comparative Example 6b

Cured Silica Nanocomposites with Surface Treatment by a Solvent-based Method

Comparative Examples 6b was prepared in the same manner as Comparative Examples 12 and 13 except a silica nanocomposite with particle surface treatment and defoamer was used.

Comparative Examples 7b-9b

Cured Silica Nanocomposites with Dispersant by a Solvent-free Method

Comparative Examples 7b-9b were prepared in the same manner as Comparative Examples 12 and 13 except a silica nanocomposite with a dispersant was used.

Examples 2b and 3b

Cured Silica Nanocomposites without Surface Treatment by a Solvent-free Method

Comparative Examples 2b and 3b were prepared in the same manner as Comparative Examples 12 and 13 except a silica nanocomposite without a dispersant or surface treatment agent was used.

TABLE 6

Thermal and mechanical characterization of cured nanocomposites

| | Example | | | | | | | |
|---|---|---|---|---|---|---|---|---|
| | CE 12 | CE 13 | CE 6b | CE 7b | CE 8b | CE 9b | EX 2b | EX 3b |
| Particle Dispersant | — | — | NALCO — | NANOSIL W9010 | NANOSIL D570 | NANOSIL 2152 | NANOSIL — | NANOSIL — |
| Surface Agent | — | — | TMPS | — | — | — | — | — |
| Epoxy Nanocomposite (wt %) | 0 | 0 | 67.89 (CE 6) | 61.58 (CE 7) | 68.31 (CE 8) | 61.42 (CE 9) | 67.50 (EX 2) | 60.72 (EX 3) |
| Epoxy (EPON 828) (wt %) | 52.94 | 0 | 0 | 0 | 0 | 0 | 0 | 0 |
| Epoxy (EPON 826) (wt %) | 0 | 41.14 | 0 | 0 | 0.05 | 0 | 0.32 | 0 |
| Diluent (HELOXY 107) (wt %) | 0 | 10.28 | 0 | 6.68 | 0.01 | 6.73 | 0.08 | 6.86 |
| Defoamer (BYK 1790) (wt %) | 0.16 | 0.18 | 0 | 0.18 | 0.17 | 0.18 | 0.17 | 0.18 |

TABLE 6-continued

Thermal and mechanical characterization of cured nanocomposites

| | Example | | | | | | | |
|---|---|---|---|---|---|---|---|---|
| | CE 12 | CE 13 | CE 6b | CE 7b | CE 8b | CE 9b | EX 2b | EX 3b |
| Curing agent (LINDRIDE 36V) (wt %) | 47.0 | 48.39 | 32.11 | 31.56 | 31.45 | 31.66 | 31.93 | 32.24 |
| Glass Transition Temperature ($T_g$) (° C.) | 137.2 | 119.5 | 116.4 | 114.1 | 115.2 | 116.1 | 118.7 | 117.8 |
| $T_g$ depression vs. E828 (° C.) | 0 | 17.7 | 20.8 | 23.1 | 22.0 | 21.1 | 18.5 | 19.4 |
| $T_g$ depression vs. 80/20 E826/H107 (° C.) | — | 0 | 3.1 | 5.4 | 4.3 | 3.4 | 0.8 | 1.7 |
| $E'_{glass}$ (Mpa) | 2,364 | 2,334 | 4,073 | 4,152 | 4,027 | 4,082 | 4,001 | 4,063 |
| $E'_{rubber}$ (Mpa) | 24.44 | 24.78 | 38.51 | 50.78 | 55.15 | 57.97 | 56.95 | 56.56 |
| Tan δ Height | 1.52 | 1.48 | 1.39 | 1.31 | 1.23 | 1.25 | 1.32 | 1.34 |

Table 6 shows the $T_g$ of two unfilled resins, EPON 828 and (80/20) EPON 826/HELOXY 107, and the silica nanocomposites. All samples were cured with an anhydride curing agent, LINDRIDE 36V. The $T_g$ depression exhibited by the silica nanocomposites is mostly due to the presence of the relative diluent, HELOXY 107. The cured silica nanocomposites without surface treatment experience a lower $T_g$ depression compared to the nanocomposites with a surface treatment agent or a dispersant. Also from Table 6, the storage moduli in the glassy state (E'glass) and rubbery state (E'rubber) are significantly higher for the nanocomposites relative to the unfilled epoxies. The E'glass and E'rubber for the nanocomposites without a surface treatment agent are similar to the corresponding nanocomposites with a surface treatment agent or a dispersant.

Comparative Examples 14 and 15

Cured Resin without Nanoparticles

Comparative Examples 14 and 15 were prepared by mixing resin without nanoparticles with an anhydride curing agent (LINDRIDE 36V) and a defoamer (BYK 1790) according to Table 7 using a speedmixer (Model ARV-3 Vacuum Mixer, Thinky USA, Inc., Laguna Hills, Calif.). The examples were subsequently degassed. The mixture was transferred to a mold and then placed in an oven. The examples were cured for 3 hours at 63° C., followed by 2 hours at 91° C., and followed by 2 hours at 85° C.

Comparative Example 6c

Cured Silica Nanocomposites with Surface Treatment by a Solvent-based Method

Comparative Example 6c was prepared in the same manner as Comparative Examples 14 and 15 except a silica nanocomposite with particle surface treatment and defoamer was used.

Comparative Examples 7c-9c

Cured Silica Nanocomposites with Dispersant by a Solvent-free Method

Comparative Examples 7c-9c were prepared in the same manner as Comparative Examples 14 and 15 except a silica nanocomposite with a dispersant was used.

Example 2c

Cured Silica Nanocomposites without Surface Treatment by a Solvent-free Method

Example 2c was prepared in the same manner as Comparative Examples 14 and 15 except a silica nanocomposite without a dispersant or particle surface treatment agent was used.

TABLE 7

Tensile properties of cured nanocomposites

| | Example | | | | | | |
|---|---|---|---|---|---|---|---|
| | CE 14 | CE 15 | CE 6c | CE 7c | CE 8c | CE 9c | EX 2c |
| Particle Dispersant | — | — | — | NANOSIL W9010 | NANOSIL D570 | NANOSIL 2152 | NANOSIL — |
| Surface Agent | — | — | TMPS | — | — | — | — |
| Epoxy Nanocomposite (wt %) | 0 | 0 | 67.92 (CE 6) | 61.59 (CE 7) | 68.29 (CE 8) | 61.43 (CE 9) | 67.49 (EX 2) |
| Epoxy (EPON 828) (wt %) | 52.93 | 0 | 0 | 0 | 0 | 0 | 0 |
| Epoxy (EPON 826) (wt %) | 0 | 41.16 | 0 | 0 | 0.06 | 0 | 0.32 |

TABLE 7-continued

Tensile properties of cured nanocomposites

| | Example | | | | | | |
|---|---|---|---|---|---|---|---|
| | CE 14 | CE 15 | CE 6c | CE 7c | CE 8c | CE 9c | EX 2c |
| Diluent (HELOXY 107) (wt %) | 0 | 10.29 | 0 | 6.69 | 0.01 | 6.72 | 0.10 |
| Defoamer (BYK 1790) (wt %) | 0.17 | 0.17 | 0 | 0.17 | 0.17 | 0.17 | 0.17 |
| Curing agent (LINDRIDE 36V) (wt %) | 46.90 | 48.38 | 32.08 | 31.55 | 31.46 | 31.67 | 31.92 |
| Mean Tensile Modulus (ksi)* | 497 (2.8) | 455 (6.4) | 744 (18.7) | 736 (18.5) | 755 (14.3) | 741 (12.3) | 736 (3.7) |
| Max Strain @ Yield (%) | DNY | 5.10 | 3.45 | 3.51 | 3.52 | 3.66 | 3.46 |
| Max Strain @ Break (%) | 3.13 | 8.10 | 6.75 | 4.59 | 4.46 | 4.99 | 5.11 |

*standard deviation in parentheses;
DNY: did not yield

Figure 7:
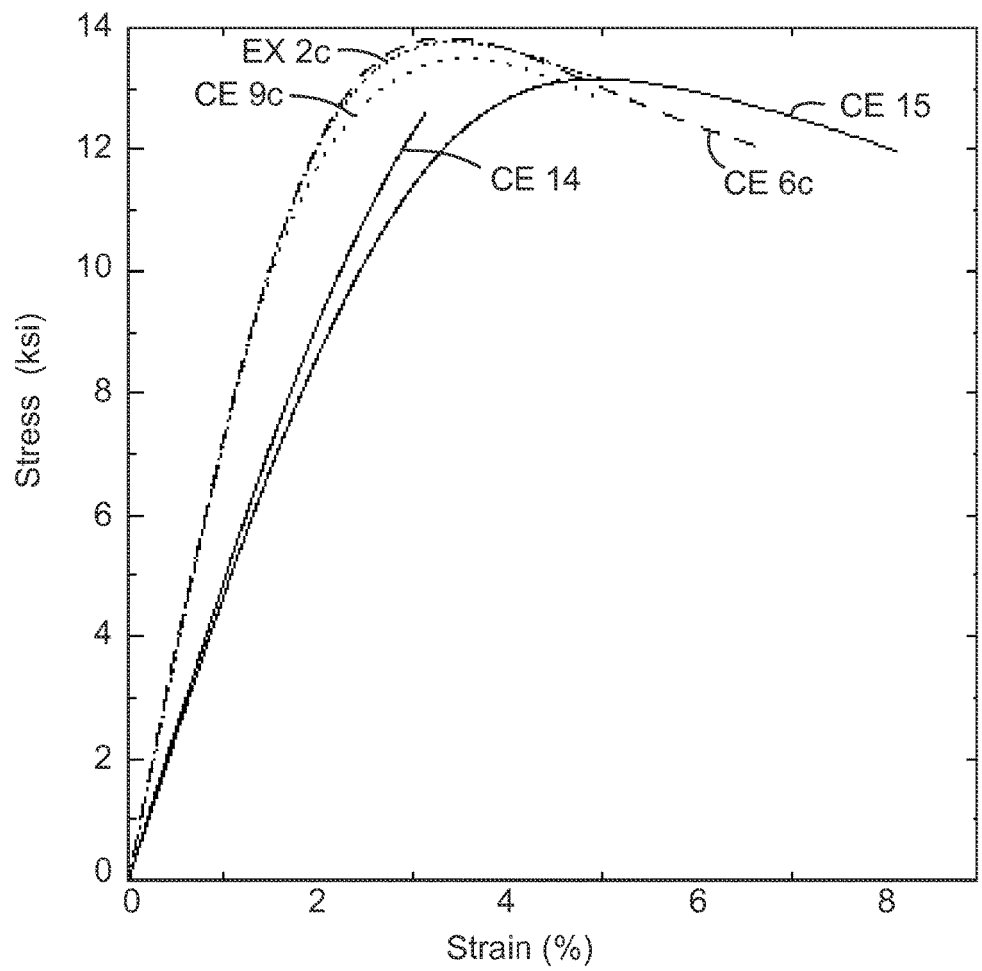
FIG. 7 is a graph presenting percent strain versus stress for each of Example 2c, Comparative Example 6c, Comparative Example 9c, Comparative Example 14, and Comparative Example 15.

Table 7 shows the tensile modulus and strain behavior of two unfilled resins, EPON 828 and (80/20) EPON 826/HELOXY 107, and the silica nanocomposites. All samples were cured with an anhydride curing agent, LINDRIDE 36V. Comparative Examples 14 and 15 show that the presence of the reactive diluent, HELOXY 107, leads to a decrease in the tensile modulus. However, the addition of silica nanoparticles results in a significant increase in the tensile modulus relative to both EPON 828 and 80/20 EPON 826/HELOXY 107. Furthermore, the silica nanocomposite without a surface treatment agent or a dispersant exhibits similar tensile modulus to samples processed with a surface treatment agent or a dispersant. EPON 828 does not exhibit yield behavior whereas the 80/20 EPON 826/HELOXY 107 resin does. Similarly, all the silica nanocomposites, both with and without a surface treatment agent or a dispersant exhibit yield behavior. From Comparative Examples 14 and 15, the maximum strain at break increases significantly due to the presence of the reactive diluent, HELOXY 107. The silica nanocomposites exhibit lower maximum strain at break than 80/20 EPON 826/HELOXY 107 but maintain a significantly high value even despite the presence of the nanoparticles. The enhanced strain behavior of the silica nanocomposites is exhibited both with and without a surface treatment agent or a dispersant. FIG. 7 shows representative stress-strain curves for the cured resins of Table 7.

Example 2d (Prophetic Example)

Pressure Vessel Containing a Silica Nanocomposite without Surface Treatment by a Solvent-free Method Example 2d is prepared by forming a silica nanocomposite according to the formulation and method of Example 2a. A pressure vessel is prepared by winding carbon fiber (e.g., TORAY T700SC-12000-50C, Lot #A2106M2, Toray Carbon Fibers America, Inc., Decatur, Ala.) saturated in the silica nanocomposite, according to the coating process described in U.S. application Ser. No. 13/154,615 (Thunhorst et al.). The wound vessel is then cured according to the conditions described in U.S. application Ser. No. 13/154,615 (Thunhorst et al.) to form the pressure vessel.

Comparative Examples 16-18 (Prophetic Examples)

Silica Nanocomposites with Surface Treatment by a Solvent-free Method

The silica nanocomposites of Comparative Examples 16-18 are prepared with a pyrogenic silica (NANOSIL) using the Immersion Mill Method described above except that the silica is milled in a curing agent (LINDRIDE 36V) with a dispersant, but in the absence of any epoxy (EPON 826) or reactive diluent (HELOXY 107).

Example 4 (Prophetic Example)

Silica Nanocomposite without Surface Treatment by a Solvent-free Method

The silica nanocomposite of Example 4 is prepared as Comparative Examples 16-18 except no dispersant or surface treatment agent is included in the formulation.

TABLE 8

Composition and characterization of uncured nanocomposites

| | Example | | | |
|---|---|---|---|---|
| | CE 16 | CE 17 | CE 18 | EX 4 |
| Particle | NANOSIL | NANOSIL | NANOSIL | NANOSIL |
| Dispersant | W9010 | D570 | 2152 | — |
| Nanoparticle (wt %) | 52.00 | 52.00 | 52.00 | 52.00 |
| Curing agent (LINDRIDE 36V) (wt %) | 46.70 | 46.70 | 46.70 | 48.00 |
| Dispersant or Surface Agent (wt %) | 1.30 | 1.30 | 1.30 | 0 |

Comparative Examples 16a-18a (Prophetic Examples)

Cured Silica Nanocomposites with Surface Treatment by a Solvent-free Method

The cured silica nanocomposites of Comparative Examples 16a-18a are prepared by mixing resins of Comparative Examples 16-18 with epoxy (EPON 826) and reactive diluent (HELOXY 107) according to Table 9 using a speedmixer (Model ARV-3 Vacuum Mixer, Thinky USA, Inc., Laguna Hills, Calif.). The mixture is transferred to a mold and then placed in an oven. The examples are cured for 3 hours at 63° C., followed by 2 hours at 91° C., and followed by 2 hours at 85° C.

Examples 4a (Prophetic Examples)

Cured Silica Nanocomposites without Surface Treatment by a Solvent-free Method

Example 4a is prepared in the same manner as Comparative Examples 16a-18a except a silica nanocomposite without dispersant or surface treatment agent is used.

TABLE 9

Composition of cured nanocomposites

| | Example | | | |
|---|---|---|---|---|
| | CE 16a | CE 17a | CE 18a | EX 4a |
| Particle | NANOSIL | NANOSIL | NANOSIL | NANOSIL |
| Dispersant | W9010 | D570 | 2152 | — |
| Nanocomposite (wt %) | 65.70 (CE 16) | 65.70 (CE 17) | 65.70 (CE 18) | 65.14 (EX 4) |
| Epoxy (EPON 826) (wt %) | 27.26 | 27.26 | 27.26 | 27.71 |
| Diluent (HELOXY 107) (wt %) | 6.81 | 6.81 | 6.81 | 6.93 |
| Defoamer (BYK 1790) (wt %) | 0.23 | 0.23 | 0.23 | 0.23 |

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A nanocomposite comprising spherical pyrogenic silica nanoparticles dispersed in a curable resin; wherein the nanocomposite contains less than 2% by weight solvent, and wherein the nanocomposite contains less than 0.5% by weight dispersant based on the nanoparticle weight, wherein the nanocomposite comprises from about 10 to about 70 weight percent of the spherical pyrogenic silica nanoparticles, and wherein the nanocomposite has a viscosity of 1 to 100 Pascals·second (Pa·s), as determined according to ASTM D 2196 at 30 degrees Celsius and at a constant shear rate of 1 $s^{-1}$.

2. The nanocomposite of claim 1 wherein the spherical pyrogenic silica nanoparticles have a unimodal particle size distribution comprising diameters in the range of from about 1 nanometer to about 500 nanometers.

3. The nanocomposite of claim 1 wherein the nanocomposite contains less than 0.1% by weight dispersant based on the nanoparticle weight.

4. The nanocomposite of claim 1 further comprising a catalyst for reacting silanol groups on the surface of the spherical pyrogenic silica nanoparticles with the curable resin.

5. The nanocomposite of claim 1 further including a surface treatment agent including an organosilane, a monohydric alcohol, a polyol, or a combination thereof, for treating surfaces of the spherical pyrogenic silica nanoparticles.

6. The nanocomposite of claim 1 further comprising at least one diluent comprising a mono- or poly-functional glycidyl ether or styrene.

7. The nanocomposite of claim 1 further comprising at least one processing aid selected from the group consisting of curing agents, cure accelerators, defoamers, air release agents, crosslinking agents, dyes, flame retardants, pigments, impact modifiers, and flow control agents.

8. The nanocomposite of claim 1 wherein the curable resin comprises an epoxy resin, a curable imide resin, a vinyl ester resin, an acrylic resin, a bisbenzocyclobutane resin, a polycyanate ester resin, or a mixture thereof.

9. The nanocomposite of claim 1 further comprising a filler comprising at least one of reinforcing continuous fibers, reinforcing discontinuous fibers, and hollow glass bubbles, wherein the filler comprises carbon, glass, ceramic, boron, silicon carbide, basalt, polyimide, polyamide, polyethylene, polypropylene, polyacrylonitrile, or a combination thereof.

10. A nanocomposite comprising spherical pyrogenic silica nanoparticles dispersed in a curing agent; wherein the nanocomposite contains less than 2% by weight solvent, wherein the nanocomposite contains less than 0.5% by weight dispersant based on the nanoparticle weight, wherein the nanocomposite comprises from about 10 to about 70 weight percent of the spherical pyrogenic silica nanoparticles, and wherein the nanocomposite has viscosity of 1 to 100 Pascals·seconds (Pa·s), as determined according to ASTM D 2196 at 30 degrees Celsius and at a constant shear rate of 1 $s^{-1}$.

11. A prepreg comprising the nanocomposite of claim 1.

* * * * *

UNITED STATES PATENT AND TRADEMARK OFFICE
CERTIFICATE OF CORRECTION

PATENT NO. : 10,023,724 B2
APPLICATION NO. : 14/911103
DATED : July 17, 2018
INVENTOR(S) : Peter Condo Page 1 of 1

It is certified that error appears in the above-identified patent and that said Letters Patent is hereby corrected as shown below:

In the Specification

Column 12,
Line 28, delete "o,o'-diallylbisphenol" and insert -- o,o'-diallyl bisphenol --, therefor.

Column 15,
Line 17, after "(shear-thinning)" insert -- . --.

Column 16,
Line 30, delete "o,o'-diallylbisphenol" and insert -- o,o'-diallyl bisphenol --, therefor.

In the Claims

Column 44,
Line 48, in Claim 10, after "has" insert -- a --.

Signed and Sealed this
Twenty-eighth Day of August, 2018

Andrei Iancu
*Director of the United States Patent and Trademark Office*